US008331655B2

(12) United States Patent
Sato et al.

(10) Patent No.: US 8,331,655 B2
(45) Date of Patent: Dec. 11, 2012

(54) LEARNING APPARATUS FOR PATTERN DETECTOR, LEARNING METHOD AND COMPUTER-READABLE STORAGE MEDIUM

(75) Inventors: Hiroshi Sato, Kawasaki (JP); Katsuhiko Mori, Kawasaki (JP); Masakazu Matsugu, Yokohama (JP); Kan Torii, Tokyo (JP); Yuji Kaneda, Tokyo (JP); Takashi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 12/485,020

(22) Filed: Jun. 15, 2009

(65) Prior Publication Data
US 2009/0324060 A1 Dec. 31, 2009

(30) Foreign Application Priority Data

Jun. 30, 2008 (JP) ................................. 2008-171229
Jun. 30, 2008 (JP) ................................. 2008-171230

(51) Int. Cl.
*G06K 9/62* (2006.01)
*G06K 9/40* (2006.01)
(52) U.S. Cl. ...................................... 382/159; 382/260
(58) Field of Classification Search .................. 382/118, 382/159, 224, 228, 209, 218, 260
See application file for complete search history.

(56) References Cited

U.S. PATENT DOCUMENTS

| 5,760,346 | A | 6/1998 | Kobayashi et al. |
| 5,761,087 | A | 6/1998 | Yoshimura et al. |
| 5,862,049 | A | 1/1999 | Sato et al. |
| 6,225,986 | B1 | 5/2001 | Sato et al. |
| 6,239,792 | B1 | 5/2001 | Yanagisawa et al. |
| 6,288,711 | B1 | 9/2001 | Tanaka et al. |
| 6,611,258 | B1 | 8/2003 | Tanaka et al. |
| 7,039,233 | B2 | 5/2006 | Mori et al. |
| 7,054,850 | B2 | 5/2006 | Matsugu |
| 7,099,505 | B2 * | 8/2006 | Li et al. .......................... 382/159 |
| 7,106,903 | B2 * | 9/2006 | Chang et al. ................... 382/190 |
| 7,274,819 | B2 | 9/2007 | Matsugu |
| 7,379,568 | B2 | 5/2008 | Movellan et al. |
| 7,577,297 | B2 | 8/2009 | Mori et al. |
| 7,624,076 | B2 * | 11/2009 | Movellan et al. ................ 706/12 |

(Continued)

FOREIGN PATENT DOCUMENTS

JP 2005-044330 2/2005

OTHER PUBLICATIONS

Tu, et al. (Image Parsing: Unifying Segmentation, Detection, and Recognition), IEEE, pp. 1-8, 2003.*
P. Viola, et al., "Rapid Object Detection Using a Boosted Cascade of Simple Features", Accepted Conference on Computer Vision and Pattern Recognition 2001, pp. 1-9.

(Continued)

*Primary Examiner* — Daniel Mariam
(74) *Attorney, Agent, or Firm* — Fitzpatrick, Cella, Harper & Scinto

(57) ABSTRACT

A learning apparatus for a pattern detector, which includes a plurality of weak classifiers and detects a specific pattern from input data by classifications of the plurality of weak classifiers, acquires a plurality of data for learning in each of which whether or not the specific pattern is included is given, makes the plurality of weak classifiers learn by making the plurality of weak classifiers detect the specific pattern from the acquired data for learning, selects a plurality of weak classifiers to be composited from the weak classifiers which have learned, and composites the plurality of weak classifiers into one composite weak classifier based on comparison between a performance of the composite weak classifier and performances of the plurality of weak classifiers.

32 Claims, 23 Drawing Sheets

U.S. PATENT DOCUMENTS

| | | | |
|---|---|---|---|
| 7,689,034 B2 * | 3/2010 | Terakawa | 382/159 |
| 7,801,337 B2 * | 9/2010 | Akahori et al. | 382/118 |
| 7,890,443 B2 * | 2/2011 | Zhang et al. | 706/45 |
| 7,991,713 B2 * | 8/2011 | Triantafillidis | 706/14 |
| 2006/0074653 A1 | 4/2006 | Mitari et al. | |
| 2006/0115157 A1 | 6/2006 | Mori et al. | |
| 2006/0228005 A1 | 10/2006 | Matsugu et al. | |
| 2007/0047822 A1 * | 3/2007 | Kitamura et al. | 382/224 |
| 2007/0242856 A1 | 10/2007 | Suzuki et al. | |
| 2008/0219516 A1 | 9/2008 | Suzuki et al. | |
| 2009/0089235 A1 | 4/2009 | Torii et al. | |
| 2009/0157707 A1 | 6/2009 | Ito et al. | |
| 2009/0219405 A1 | 9/2009 | Kaneda et al. | |

OTHER PUBLICATIONS

C. Huang, et al., "Learning Sparse Features in Granular Space for Multi-View Face Detection", Proceedings of the IEEE International Conference of Automatic Face and Gesture Recognition, pp. 401-406 (Apr. 2-6, 2006).

Mita, et al., "Joint Haar-like Features Based on Feature Co-occurrence for Face Detection", IEICE Transactions, vol. J89-D, No. 8, The Institute of Electronics, Information and Communication Engineers, p. 1791-1801, 2006.

Japanese Office Action dated Jul. 13, 2012, concerning Japanese Patent Application No. 2008-171230.

* cited by examiner

LEARNING APPARATUS FOR PATTERN DETECTOR, LEARNING METHOD AND COMPUTER-READABLE STORAGE MEDIUM

BACKGROUND OF THE INVENTION

1. Field of the Invention

The present invention relates to a learning apparatus for a pattern detector which detects a specific pattern from input data by classifications using a plurality of classifiers, a learning method, and a computer-readable storage medium.

2. Description of the Related Art

Conventionally, pattern detection methods each for detecting a specific pattern (for example, a character or human face) from input data have been proposed. Also, many methods which aim to speed up processing and improve detection precision have been proposed.

In association with such techniques, [Viola & Jones (2001) "Rapid Object Detection using a Boosted Cascade of Simple Features", Computer Vision and Pattern Recognition. (to be referred to as reference 1 hereinafter)] has proposed a technique which attains pattern detection by cascade-connecting a large number of weak classifiers which can make arithmetic operations within a short period of time, and by combining a group learning (ensemble learning) method represented by Adaboost. A weak classifier of reference 1 includes a filter which is called a rectangular filter based on a Haar base, and calculates a difference between average luminance values of regions in a rectangle. Using, the average value difference in a rectangular region calculated by this rectangular filter is used as a feature amount, and is compared with a predetermined threshold, thus determining whether or not an object is a pattern to be detected.

A final pattern detector is configured by combining a large number of weak classifiers, as described above. In reference 1, the weighted sum total of a plurality of weak classifiers is output. This configuration method uses a learning algorithm called ensemble learning (group learning). A typical algorithm of ensemble learning is Adaboost. Adaboost sets weights for samples for learning, and when learning of one weak classifier is completed, learning of the next weak classifier is started. In learning of this next weak classifier, the weights of data are sequentially updated so that the weight of a sample that is poorly classified by the previous weak classifier is set to be large. For each weak classifier, a degree of confidence indicating its classification performance is defined. This degree of confidence is decided based on, for example, an error ratio with respect to samples for learning during a learning phase.

When building the aforementioned pattern detector comprised of a large number of weak classifiers, a very large amount of time is required for learning. As described above, learning for each, respective weak classifier includes a process of making pattern detections with respect to samples for learning, and evaluating its detection performance. In order to build a high-performance detector, weak classifiers are required to have complicated expressions, and the number of weak classifier candidates to be evaluated becomes very large. Therefore, the number of repetitions of the above process also becomes very large.

To solve this problem, Japanese Patent Laid-Open No. 2005-44330 (to be referred to as reference 2 hereinafter) has proposed the following method. Weak classifier candidates, which are prepared in advance, are evaluated, some candidates that exhibit high performance are updated by a predetermined method, and a candidate which exhibits the highest performance among all is adopted as a weak classifier.

Also, [C. Huang, H. Ai, Y. Li, S. Lao (2006) "Learning Sparse Features in Granular Space for Multi-View Face Detection", Proceedings of the IEEE International Conference of Automatic Face and Gesture Recognition, pp. 401-406. (to be referred to as reference 3 hereinafter)] gives a Haar base as an initial candidate of a weak classifier. To this Haar base, specified expansion operators of three types (refine, add, remove) are defined, and a weak classifier is expanded by applying them to the weak classifier. That is, reference 3 has proposed a method which adopts a function that considers the detection performance and complexity of a weak classifier as an evaluation function, and searches for a weak classifier which exhibits comprehensively high performance in consideration of not only the detection performance but also a detection time.

SUMMARY OF THE INVENTION

The present invention provides a learning apparatus for a pattern detector, which can build a pattern detector with a high detection performance within a practical learning time, a learning method, and a computer-readable storage medium.

According to a first aspect of the present invention, there is provided a learning apparatus for a pattern detector, which includes a plurality of weak classifiers and detects a specific pattern from input data by classifications of the plurality of weak classifiers, comprising: an acquisition unit configured to acquire a plurality of data for learning in each of which whether or not the specific pattern is included is given; a learning unit configured to make the plurality of weak classifiers learn by making the plurality of weak classifiers detect the specific pattern from the data for learning acquired by the acquisition unit; a selection unit configured to select a plurality of weak classifiers to be composited from the weak classifiers which have learned by the learning unit; and a composition unit configured to composite the plurality of weak classifiers selected by the selection unit into one composite weak classifier based on comparison between a performance of the composite weak classifier and performances of the plurality of weak classifiers.

According to a second aspect of the present invention, there is provided a learning apparatus for a pattern detector, which includes a plurality of weak classifiers and detects a specific pattern from input data by classifications of the plurality of weak classifiers, comprising: a model generation unit configured to generate a weak classifier model as a basis of a weak classifier based on a plurality of data for learning, in each of which whether or not the specific pattern is included is given; an update unit configured to update state parameters of a weak classifier generated based on the weak classifier model generated by the model generation unit until the weak classifier satisfies a predetermined performance; and a management unit configured to manage an update history of the state parameters of the weak classifier in each stage updated by the update unit, wherein the update unit selects and updates a state parameter of a stage to be updated of the weak classifier from the update history managed by the management unit based on a performance evaluation result of the weak classifier.

According to a third aspect of the present invention, there is provided a learning method for a pattern detector, which includes a plurality of weak classifiers and detects a specific pattern from input data by classifications of the plurality of weak classifiers, comprising: acquiring a plurality of data for learning in each of which whether or not the specific pattern is included is given; making the plurality of weak classifiers learn in turn by making the plurality of weak classifiers detect the specific pattern from the acquired data for learning; selecting a plurality of weak classifiers to be composited from the weak classifiers which have learned; and compositing the plurality of weak classifiers into one composite weak classifier based on comparison between a performance of the composite weak classifier and performances of the plurality of weak classifiers.

According to a fourth aspect of the present invention, there is provided a learning method for a pattern detector, which includes a plurality of weak classifiers and detects a specific pattern from input data by classifications of the plurality of weak classifiers, comprising: generating a weak classifier model as a basis of a weak classifier based on a plurality of data for learning, in each of which whether or not the specific pattern is included is given; updating a state parameter of a weak classifier generated based on the generated weak classifier model until the weak classifier satisfies a predetermined performance; and managing an update history of the state parameter of the weak classifier in each updated stage, wherein the updating comprises selecting and updating a state parameter of a stage to be updated of the weak classifier from the update history managed in the managing based on a performance evaluation result of the weak classifier.

According to a fifth aspect of the present invention, there is provided a computer-readable storage medium storing a computer program for making a computer incorporated in a learning apparatus for a pattern detector, which includes a plurality of weak classifiers and detects a specific pattern from input data by classifications of the plurality of weak classifiers, function as: an acquisition unit configured to acquire a plurality of data for learning in each of which whether or not the specific pattern is included is given; a learning unit configured to make the plurality of weak classifiers learn by making the plurality of weak classifiers detect the specific pattern from the data for learning acquired by the acquisition unit; a selection unit configured to select a plurality of weak classifiers to be composited from the weak classifiers which have learned by the learning unit; and a composition unit configured to composite the plurality of weak classifiers into one composite weak classifier based on comparison between a performance of the composite weak classifier and performances of the plurality of weak classifiers.

According to a sixth aspect of the present invention, there is provided a computer-readable storage medium storing a computer program for making a computer incorporated in a learning apparatus for a pattern detector, which includes a plurality of weak classifiers and detects a specific pattern from input data by classifications of the plurality of weak classifiers, function as: a model generation unit configured to generate a weak classifier model as a basis of a weak classifier based on a plurality of data for learning, in each of which whether or not the specific pattern is included is given; an update unit configured to update state parameters of a weak classifier generated based on the weak classifier model generated by the model generation unit until the weak classifier satisfies a predetermined performance; and a management unit configured to manage an update history of the state parameters of the weak classifier in each stage updated by the update unit, wherein the update unit selects and updates a state parameter of a stage to be updated of the weak classifier from the update history managed by the management unit based on a performance evaluation result of the weak classifier.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
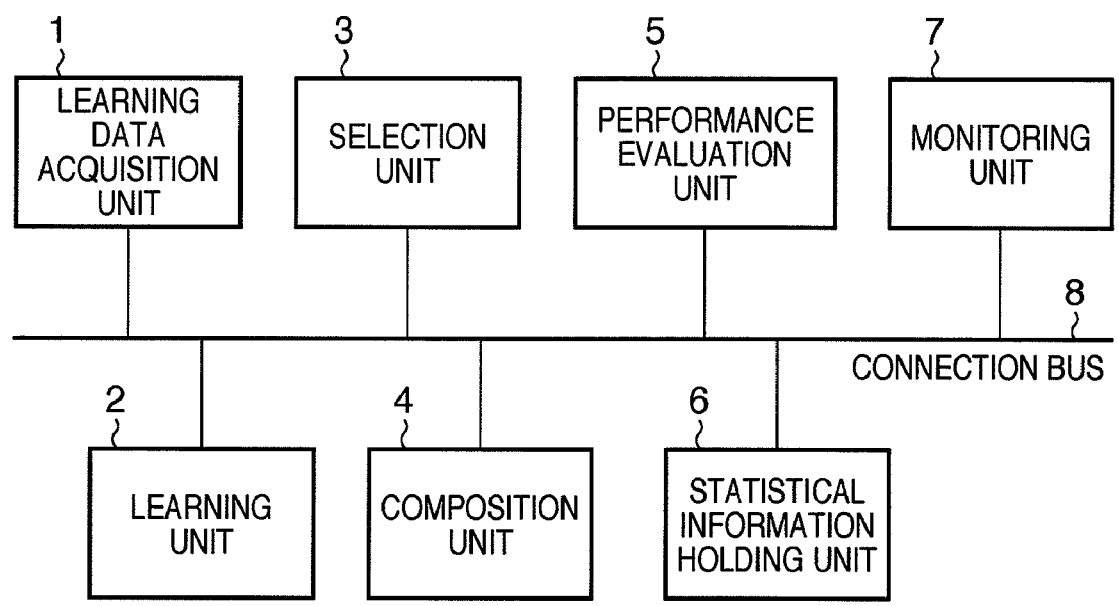
FIG. 1 is a block diagram showing an example of the arrangement of a learning apparatus for a pattern detector according to an embodiment of the present invention.

FIG. 1 is a block diagram showing an example of the arrangement of a learning apparatus 100 for a pattern detector according to an embodiment of the present invention.

A pattern detector includes one or a plurality of weak classifiers. Each weak classifier detects a specific pattern (e.g., a character or human face) from input data. The specific pattern is detected by, for example, extracting a feature amount from a predetermined region of input data, and determining based on the extracted feature amount if the predetermined region is a specific pattern to be detected.

The learning apparatus 100 makes weak classifiers learn by using data for learning, and builds a pattern detector including one or a plurality of weak classifiers as a result of learning. The learning apparatus 100 includes a learning data acquisition unit 1, learning unit 2, selection unit 37 composition unit 4, performance evaluation unit 5, and statistical information holding unit 6. Also, the learning apparatus 100 includes a monitoring unit 7 used to monitor the state of learning, and a bus 8 used to attain control/data connections among respective units. The learning data acquisition unit 1, learning unit 2, selection unit 3, composition unit 4, performance evaluation unit 5, and statistical information holding unit 6 are configured by, for example, a dedicated circuit group such as an ASIC (Application Specific Integrated Circuit). These units may also be configured by, for example, a processor (a reconfigurable processor, DSP (Digital Signal Processor), CPU, or the like). Furthermore, these units may be implemented as a program executed by a single dedicated circuit or versatile circuit (for example, a CPU).

The learning data acquisition unit 1 acquires data for learning (samples for learning or evaluation). A label indicating, for example, whether or not data includes a specific pattern to be detected is assigned in advance to each data for learning. That is, the data for learning includes data in which whether or not a specific pattern is included is given. The learning data acquisition unit 1 reads out data for learning from a memory such as an HDD (Hard Disk Drive) or optical media (e.g., a DVD and CD-ROM) (not shown), and supplies the readout data for learning to units which require the data for learning at a predetermined timing.

The learning unit 2 makes weak classifiers learn. Note that each weak classifier may be of a type based on a Haar base described in reference 1 or may have a more complicated expression or internal state value.

The selection unit 3 selects weak classifiers to be composited from a plurality of weak classifiers. Details of selection criteria and processing of the selection unit 3 will be described later.

The composition unit 4 composites a plurality of weak classifiers selected by the selection unit 3 to obtain a single weak classifier. Details of composition and processing of the composition unit 4 will be described later.

The performance evaluation unit 5 performs performance evaluation of a weak classifier. The performance evaluation unit 5 receives, for example, a weak classifier and samples for learning from the learning unit 2, and performs performance evaluation of the weak classifier in a state of that weak classifier alone or in which that weak classifier is connected to those which have already learned. In this performance evaluation, the unit 5 also performs, for example, performance evaluation of a new weak classifier alone composited by the composition unit 4. Furthermore, the unit 5 performs performance evaluation as a whole detector configured by a plurality of weak classifiers.

Note that performance evaluation criteria include an abortion ratio in addition to a detection ratio or error detection ratio with respect to evaluation data, a detection time, and the like. The abortion ratio is calculated based on the number of aborted arithmetic operations during processing for a non-face sample or the number of aborted arithmetic operations during processing until a face sample is determined as a face. The evaluation result of this abortion ratio is referred to upon execution of, for example, the composition processing of weak classifiers to be described later.

The performance evaluation of a weak classifier alone which has already learned uses samples for learning, which are read out by the learning data acquisition unit 1. Upon evaluating a sample for learning, as the detection performance, a weighted detection ratio using weights assigned in advance to samples for learning may be calculated in place of a simple detection ratio. As a result, detection performance evaluation focused on samples which are hardly detected (have large weights) can be made. Likewise, as a detection time, a weighted detection time using a weighting coefficient for each sample for learning may be calculated. Also, samples for evaluation exclusively used for performance evaluation may be prepared. Each sample for evaluation is assigned a label indicating whether or not that sample is a detection target, as in a sample for learning.

The statistical information holding unit 6 acquires statistical information of a weak classifier generated by the learning unit 2 and composition unit 4, and holds the result. The statistical information and acquisition processing will be described later.

The monitoring unit 7 displays information including a progress state indicating a prospective end time of learning or the like, and a status indicating a detection performance at that timing. The monitoring unit 7 includes a monitor such as a CRT (Cathode Ray Tube) or TFT (Thin Film Transistor) liquid crystal. The connection bus 8 is used to attain control/data connections among the aforementioned units.

The example of the arrangement of the learning apparatus 100 has been described. Note that one or a plurality of computers are embedded in the aforementioned learning apparatus 100. Each computer includes a main control unit such as a CPU, and a storage unit including a ROM (Read Only Memory), a RAM (Random Access Memory), and an HDD (Hard Disk Drive). In addition, the computer includes an input/output unit including a keyboard, mouse, and display or touch panel, a communication unit such as a network card, and the like. Note that these units are connected via a bus and the like, and are controlled when the main control unit executes programs stored in the storage unit.

<Overall Sequence>

Figure 2:
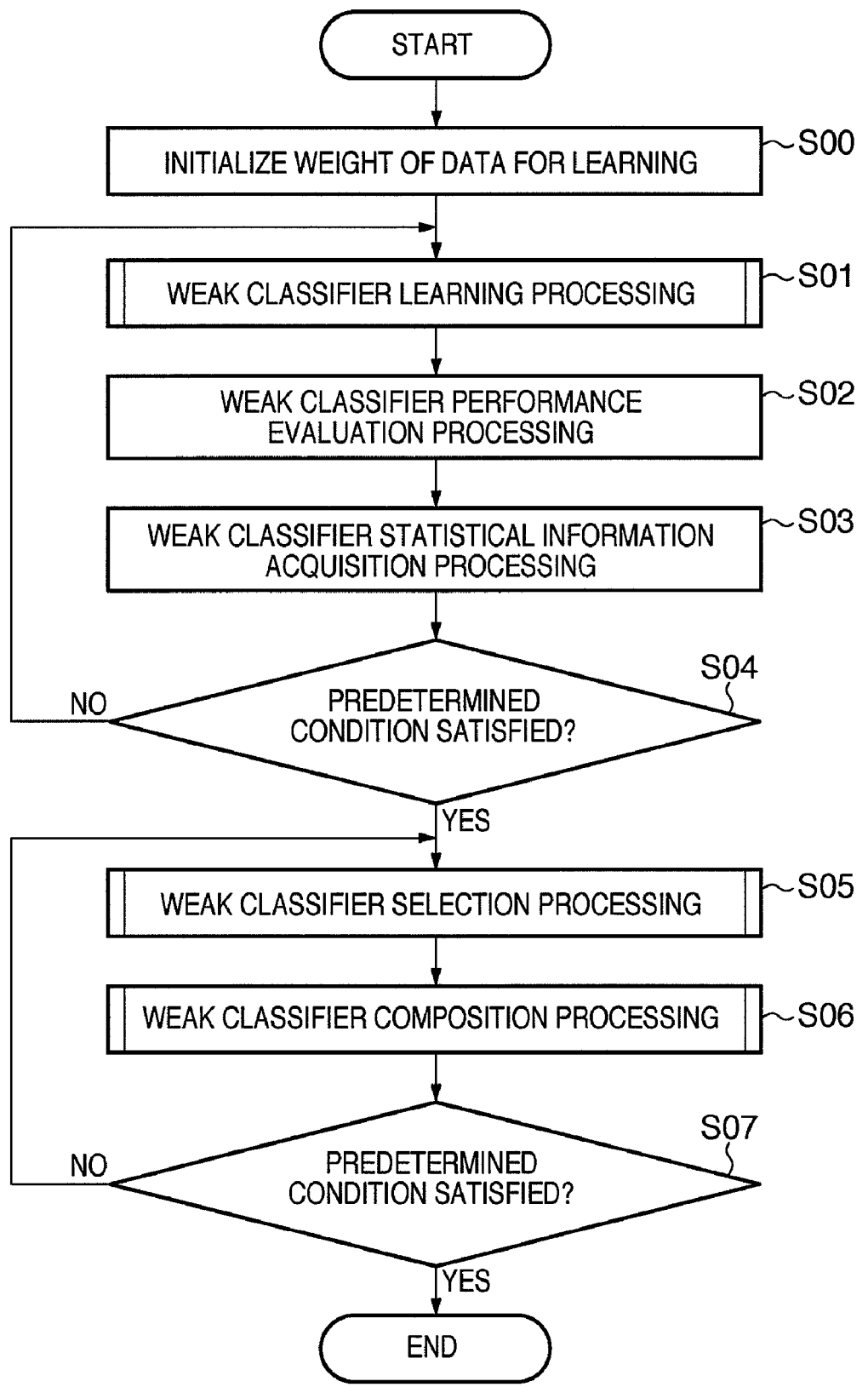
FIG. 2 is a flowchart showing an example of the overall processing of the learning apparatus.

FIG. 2 is a flowchart showing an example of the overall processing in the learning apparatus 100 shown in FIG. 1. The sequence of processing executed when the learning apparatus 100 builds a detector which detects a specific pattern from data for learning will be described below with reference to FIG. 2. A case will be exemplified below wherein data for learning are images, and a specific pattern to be detected is a human face.

The learning apparatus 100 initializes weights of data for learning (step S00). As an initial value of a weight, for example, a uniform value may be assigned so that all data for learning are evenly selected. Data for learning which are difficult to detect may be sorted out in advance to set a low probability of selection of these data in an initial stage. Data for learning include a plurality of data, which may or may not include a specific pattern. More specifically, the data for learning are a plurality of data including data of a human face (correct answer data) and data other than a human face (incorrect answer data). A label indicating whether or not data includes a face (correct answer or incorrect answer) is assigned to each data for learning. Note that the label may hold values indicating attributes, for example, information of a face size and direction.

The learning apparatus 100 executes weak classifier learning processing (step S01) In this step, a series of processes from selection of weak classifier candidates until decision of a threshold of a weak classifier are executed, thus learning and generating one weak classifier. Learning of a weak classifier can be made according to a weak classifier learning method using Adaboost described in reference 1 or 3. Details of the weak classifier learning processing will be described later.

Upon completion of learning and generation of a weak classifier, the learning apparatus 100 performs performance evaluation of the generated weak classifier (step S02). More specifically, the learning apparatus 100 calculates, as a performance evaluation value, a characteristic evaluation value when the generated weak classifier is connected to a weak classifier which has already learned. In this processing, for example, the learning apparatus 100 makes the weak classifier detect data for learning, and evaluates the weak classifier based on the detection result. In this evaluation, a correct answer ratio with respect to a face image and an error detection ratio with respect to a non-face image are evaluated based on the correct answer and incorrect answer labels of data for learning. As samples used in evaluation, data for learning may be used. Alternatively, a labeled data set for evaluation, which is prepared in advance, may be used. In addition to the correct answer ratio and error detection ratio, a detection time (detection speed) may be evaluated. Furthermore, a ratio of aborting arithmetic operations by detecting based on a non-face sample that it is not a face (abortion ratio) may be used as an evaluation criterion. Conversely, an abortion ratio of aborting subsequent arithmetic operations by detecting based on a face sample that it is a face may be added to the evaluation. Note that not only the performance after a plurality of weak classifiers are connected but also that of the new weak classifier alone generated in step S01 may be evaluated. In this case, samples for evaluation may be used in place of those for learning.

Upon completion of the performance evaluation of the weak classifier, the learning apparatus 100 acquires statistical information of the weak classifier generated in step S01 (step S03). More specifically, the learning apparatus 100 acquires statistical information associated with the characteristic evaluation value indicating the detection performance of the weak classifier acquired in step S02. As the statistical information, for example, a weighted error ratio with respect to samples for evaluation, an average detection time and its degree of dispersion, and the like are acquired. Also, information associated with the weak classifier itself such as the filter structure and parameters including a threshold of the weak classifier may be acquired. In addition, weighting vectors of data for learning used in learning of the weak classifier, pieces of weak classifier structure information of top several weak classifier candidates which exhibit high performance in addition to the selected weak classifier, and the like may be acquired. Note that a practical description about the structure information of the weak classifier will be given later. The learning apparatus 100 holds these pieces of acquired information in the statistical information holding unit 6.

The learning apparatus 100 determines if the performance of the weak classifier generated in step S01 satisfies predetermined conditions (step S04). If the performance does not satisfy the predetermined conditions, the process returns to step S01 to repeat learning of a new weak classifier. Note that the predetermined conditions include a condition as to whether or not the number of generated weak classifiers reaches a predetermined value, that as to whether or not the detection performance with respect to samples for learning or evaluation reaches a predetermined criterion, and so forth.

If the predetermined conditions are satisfied in step S04, the learning apparatus 100 ends learning of the new weak classifier. Then, the learning apparatus 100 selects a plurality of weak classifiers to be composited (step S05), and composites the selected weak classifiers (step S06). In this weak classifier composition processing, a plurality of weak classifiers are combined into one or a predetermined number or less of weak classifiers under predetermined conditions. Note that the practical sequences of selection and composition will be described later.

Upon completion of composition, the learning apparatus 100 determines whether or not predetermined conditions are satisfied (step S07). The predetermined conditions include, for example, the number of weak classifiers, a condition as to whether or not the performance of a detector as a whole upon connecting the newly composited weak classifier to an existing detector which is composited and connected reaches a predetermined value, and so forth. If the predetermined conditions are not satisfied, the process returns to the weak classifier selection processing in step S05 to repeat a process for selecting and compositing weak classifiers. If the predetermined conditions are satisfied, the learning apparatus 100 ends this processing. The overall processing sequence in the learning apparatus 100 according to this embodiment has been described.

<Weak Classifier Learning Processing>

Figure 3:
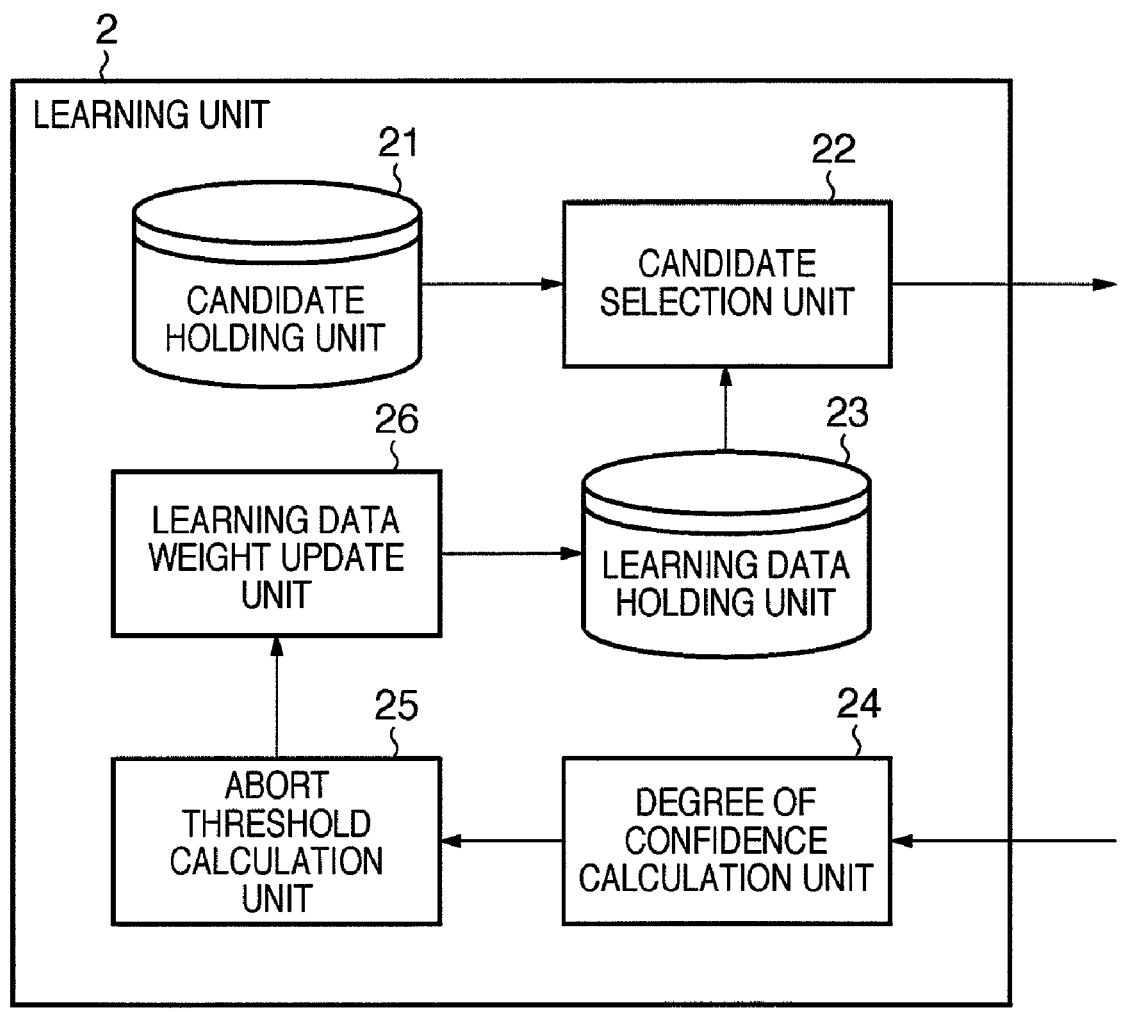
FIG. 3 is a block diagram showing an example of the arrangement of a learning unit.

The weak classifier learning processing in step S01 shown in FIG. 2 will be described below. Note that the processing to be described below is basically a state-of-the-art technique, and a description about a part that does not relate to this embodiment will not be given as needed. FIG. 3 is a block diagram showing an example of the arrangement of the learning unit 2.

The learning unit 2 includes a candidate holding unit 21, candidate selection unit 22, learning data holding unit 23, degree of confidence calculation unit 24, abort threshold calculation unit 25, and learning data weight update unit 26.

The candidate holding unit 21 holds weak classifier candidates. That is, the unit 21 holds the filter structure of a weak classifier. The unit 21 may often hold a plurality of filter structures such as a filter structure based on a Haar base described in reference 1, and a complicated filter structure of higher dimensions described in reference 3. Note that the unit 21 may hold a combination of these filter structures. Also, the unit 21 may dynamically generate a filter structure upon reception of an inquiry about a filter candidate in place of holding the filter structure prepared in advance. Upon generating a filter structure, for example, a method described in reference 3 may be adopted or a filter structure may be randomly generated.

The candidate selection unit 22 selects a weak classifier candidate from those held in the candidate holding unit 21. The learning data holding unit 23 holds data for learning weighted by the learning data weight update unit 26. The learning data holding unit 23 transfers the held data for learning to the candidate selection unit 22 together with weight data.

The degree of confidence calculation unit 24 receives the outputs from the performance evaluation unit 5 and statistical information holding unit 6 (to be described later), and calculates the degree of confidence of weak classifiers upon connecting a plurality of weak classifiers.

The abort threshold calculation unit 25 calculates an abort threshold used to abort arithmetic operations during processing without any processing by the weak classifiers. The learning data weight update unit 26 updates weights of data for learning based on the degree of confidence of the weak classifiers calculated by the degree of confidence calculation unit 24.

Figure 4:
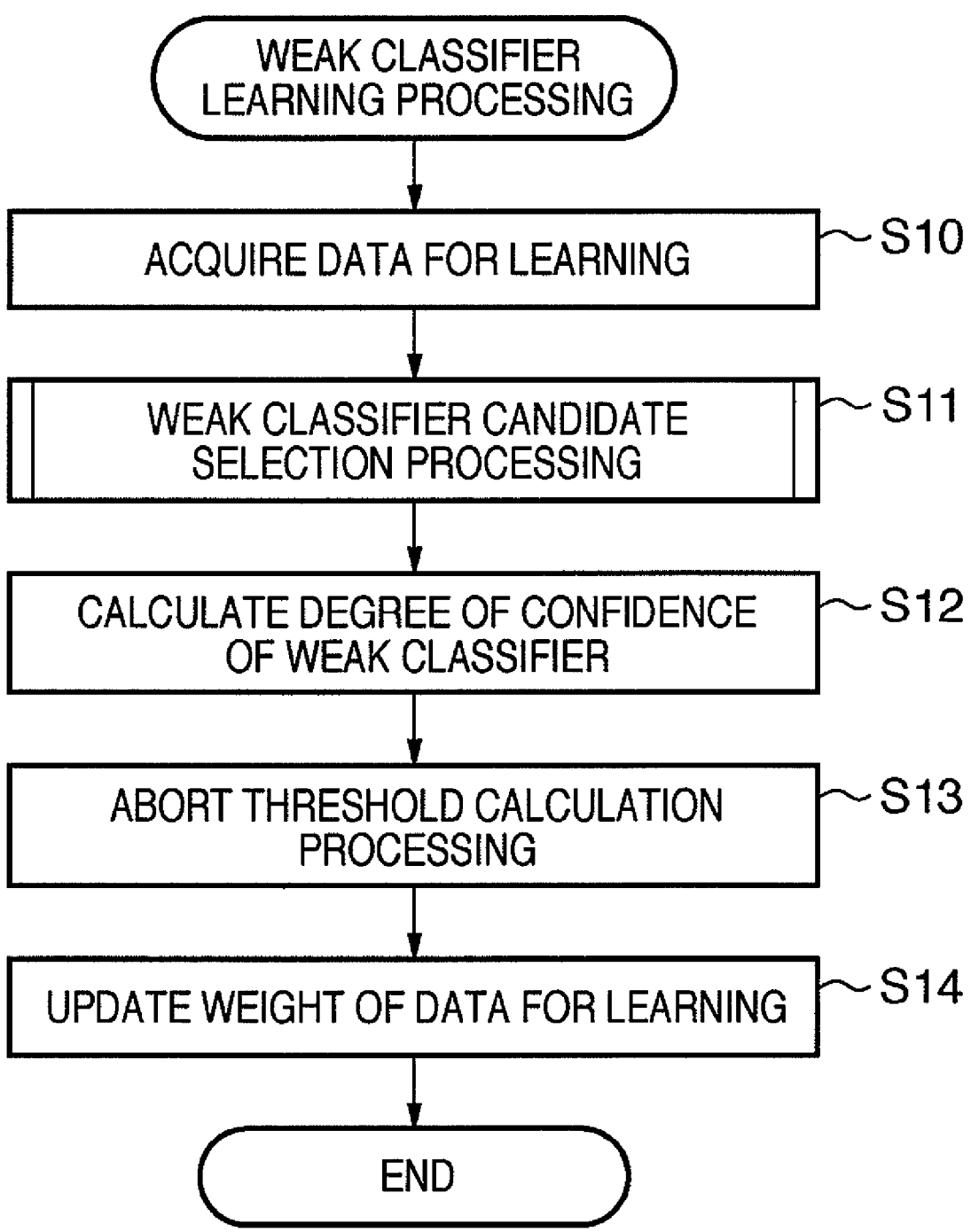
FIG. 4 is a flowchart showing an example of weak classifier learning processing.

FIG. 4 is a flowchart showing an example of the weak classifier learning processing in step S01 shown in FIG. 2. This processing is mainly executed by the learning unit 2.

In the learning apparatus 100, the learning unit 2 acquires data for learning from the learning data acquisition unit 1 (step S10). The data for learning are weighted by predetermined weights. Note that at the time of first learning of a weak classifier, the weights may have a uniform distribution. That is, a weight given by:

$$W_1(n) = \frac{1}{N} \quad (1)$$

is assigned.

Note that the weights $W_1(n)$ of data for learning represent those of data $D_n (=D_1, \ldots, D_N)$ for learning for the (i=1)-th weak classifier. N is the total number of data for learning.

In the learning unit 2, the candidate selection unit 22 selects a weak classifier candidate (step S11). In this step, a practical filter structure of a weak classifier and a threshold for a filter output value are decided. Also, a weighted error ratio of the i-th weak classifier, which is given by:

$$\varepsilon_i = \sum_{n \in \text{incorrect answer sample}} W_i(n) \quad (2)$$

is calculated.

An incorrect answer sample in equation (2) means data which is erroneously determined by a weak classifier. According to equation (2), the weighted error ratio $\varepsilon_i$ is calculated by summing up only weights $W_i(n)$ of data for learning, which are erroneously determined by a weak classifier, of the data for learning. Therefore, when data for learning with a large weight of the data for learning is erroneously determined, the value of the weighted error ratio $\varepsilon_i$ becomes large.

Upon completion of selection of a weak classifier candidate, the degree of confidence calculation unit 24 calculates a degree of confidence of the weak classifier from the weighted error ratio of the weak classifier selected in step S11 (step S12). The degree of confidence of the weak classifier is calculated by:

$$\alpha_i = \frac{1}{2} \ln\left(\frac{1-\varepsilon_i}{\varepsilon_i}\right) \quad (3)$$

As can be seen from equation (3), the degree of confidence of the weak classifier increases with decreasing weighted error ratio.

Next, the abort threshold calculation unit 25 calculates an abort threshold $C_i$ (step S13). For example, the smallest value of all filter output values for detection target data (in this case, face data) and a threshold of the filter output value of the weak classifier is calculated as the abort threshold $C_i$. In this way, arithmetic operations of at least detection target data (face data) can be prevented from being aborted. Alternatively, the abort threshold may be set to prevent arithmetic operations for data for learning with a large weight from being aborted. That is, the minimum value of filter output values only for data for learning whose weights are larger than a certain value may be calculated in place of calculating the minimum value of filter output values for all detection target data.

The learning data weight update unit 26 updates weights of the data for learning (step S14). Using the degree of confidence of the weak classifier calculated in step S12, a weight of the data for learning required upon calculating the next weak classifier can be calculated by:

$$W_{i+1}(n) = \begin{cases} \dfrac{W_i(n)\exp(-\alpha_i)}{Z_i} & (n \in \text{correct answer sample}) \\ \dfrac{W_i(n)\exp(\alpha_i)}{Z_i} & (n \in \text{incorrect answer sample}) \end{cases} \quad (4)$$

where $Z_i$ is a normalization factor given by:

$$Z_i = \sum_{n \in \text{correct answer sample}} W_i(n)\exp(-\alpha_n) + \sum_{n \in \text{incorrect answer sample}} W_i(n)\exp(\alpha_n) \quad (5)$$

The sums are independently calculated for data for learning, whose determination results by the weak classifier are correct answers and incorrect answers. As can be seen from equation (4), a weight of data for learning which results in an incorrect answer becomes large in that for the next weak classifier. The weight becomes smaller with increasing degree of confidence of the current weak classifier.

Figure 5:
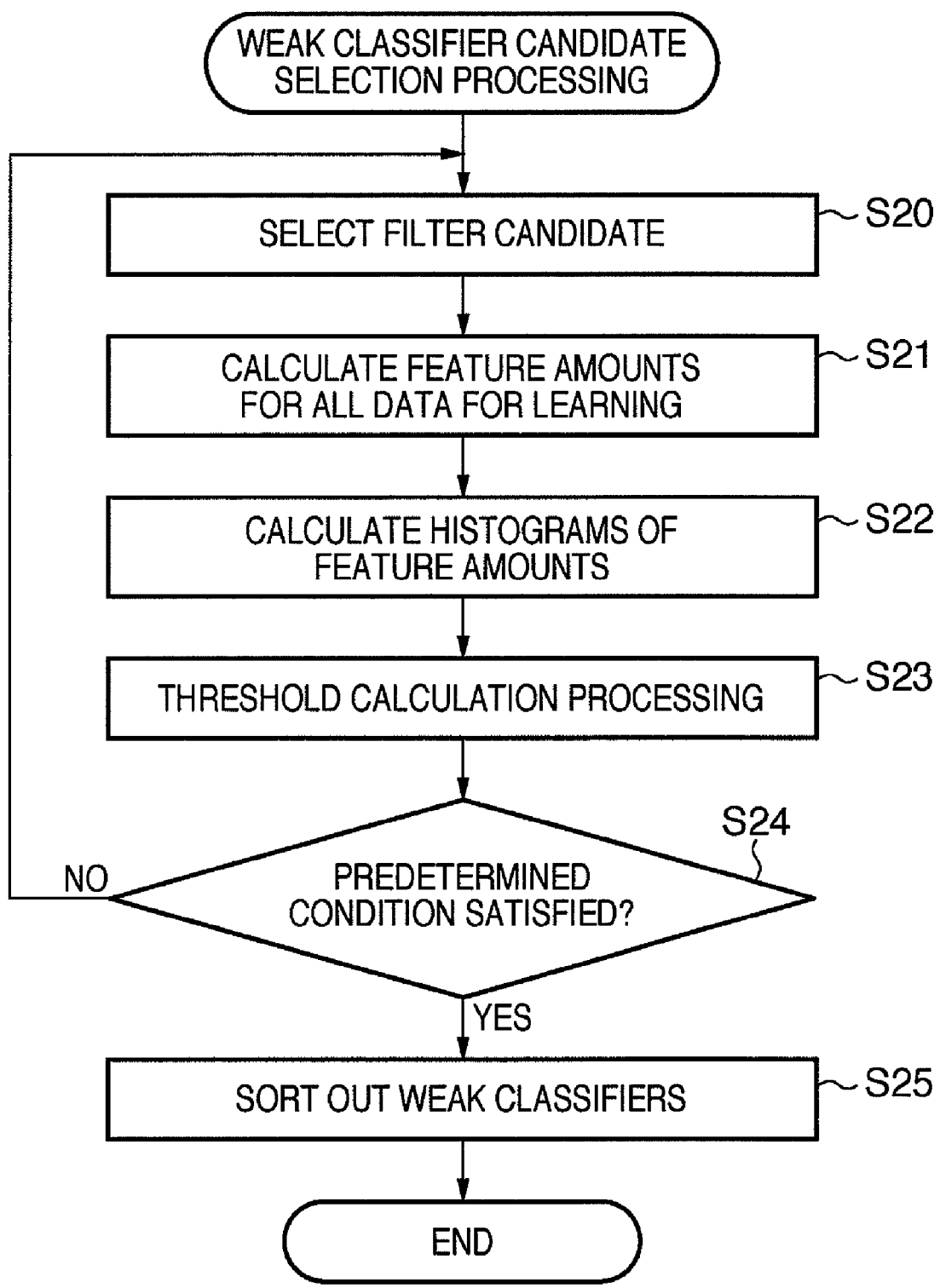
FIG. 5 is a flowchart showing an example of weak classifier candidate selection processing.

The weak classifier candidate selection processing in step S11 shown in FIG. 4 will be described below with reference to FIG. 5.

The candidate selection unit 22 selects a weak classifier candidate and, more particularly, a filter candidate (step S20). The filter candidate can be randomly selected from the candidate holding unit 21. In order to prevent a filter selected by the weak classifier which has already learned from being repetitively selected, a filter may be selected from those in which the corresponding filter are excluded from candidates. In the candidate holding unit 21, filters for all configurable combinations may be prepared. However, in such case, since the number of filters becomes very large, filters selected to some extent may be held. As a criterion upon selection, a distance of filter structures may be used, as described in reference 3. That is, in order to avoid filters closer than a predetermined distance from being simultaneously selected, the number of filters of a weak classifier to be checked can be greatly reduced. Since filter composition processing is executed as the subsequent processing, relatively simple filter candidates may be searched in this step. By limiting to relatively simple filter structures, the number of filters to be searched can be greatly reduced. A definition of simplicity of a filter structure can use a state-of-the-art technique. A filter structure may be simply defined by the number of rectangles, and a definition described in reference 3 may be used.

The candidate selection unit 22 calculates filter output values (to be referred to as feature amounts hereinafter) in all data for learning using the filter selected in step S20 (step S21). The feature amounts can be calculated using a method described in, for example, reference 1 or 2.

The candidate selection unit 22 calculates histograms based on the feature amounts calculated in step S21 and the weights of the data for learning (step S22). A case will be explained below wherein a feature amount has one dimension, for the sake of simplicity. A histogram is specified by one axis which plots the feature amounts, that is, filter output values for the data for learning, and the other axis which plots the accumulated values of weights of the data for learning. The accumulated weights are independently calculated for detection target data (face data) and non-detection target data (non-face data).

Figure 6:
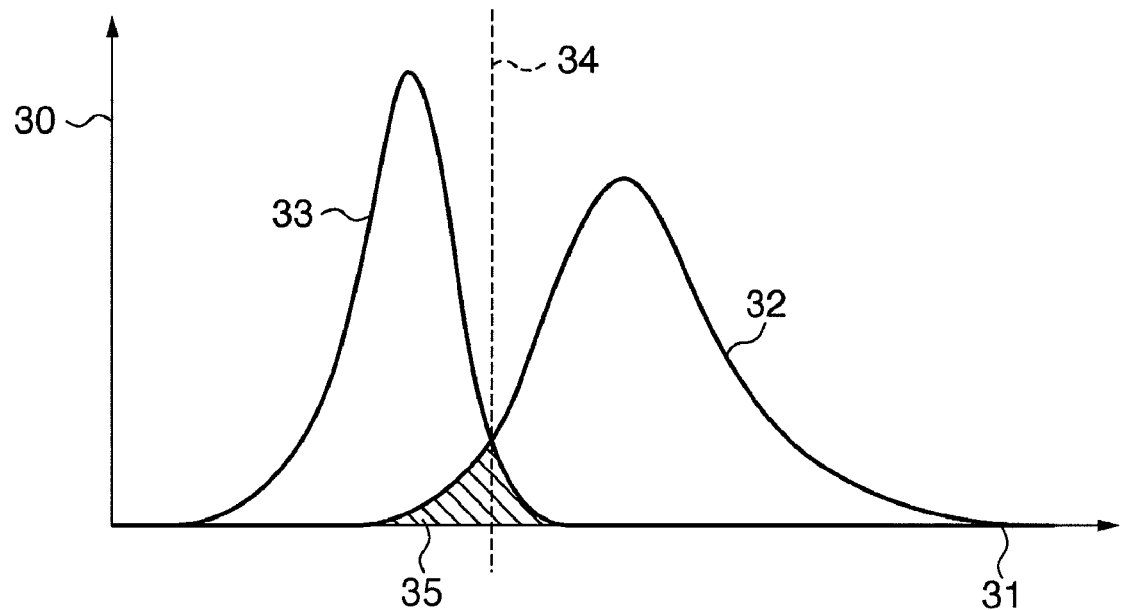
FIG. 6 is a graph showing an example of histograms of face data and non-face data in weak classifier learning.

FIG. 6 is a graph showing an example of histograms. The abscissa plots the filter output value 31, and the ordinate plots the accumulated weight 30. A curve 32 in FIG. 6 expresses the distribution of accumulated weights of face data, and a curve 33 in FIG. 6 similarly expresses the distribution of accumulated weights of non-face data. If a threshold Th 34 in FIG. 6 is set, the weighted error ratio equals the area of a hatched region 35 in FIG. 6. By variously moving the threshold Th, a threshold Th corresponding to the smallest area of the hatched region 35 in FIG. 6 is calculated. At the same time, the weighted error ratio at the time of decision of the threshold is stored and held. As described above, a threshold for the filter output values can be calculated based on the histograms associated with the feature amounts and the weights of the data for learning.

After the threshold is decided, the candidate selection unit 22 determines if predetermined conditions are satisfied (step S24). Note that the predetermined conditions include a condition as to whether or not the number of searched filter candidates reaches a predetermined value, that as to whether or not the weighted error ratio which is set in advance is achieved, and so forth.

After completion of filter candidate search, a weak classifier which exhibits most excellent performance is selected from these filter candidates (step S25). For example, a weak classifier which achieves the lowest weighted error ratio can be selected. An evaluation function which introduces simplicity of the filter structure of a weak classifier in evaluation in addition to the weighted error ratio may be defined, and a weak classifier which yields the best value of that evaluation function may be selected.

<Weak Classifier Selection Processing>

The weak classifier selection processing in step S05 shown in FIG. 2 will be described below. In the weak classifier selection processing, processing for selecting weak classifiers to be composited based on predetermined conditions is executed.

Figure 7:
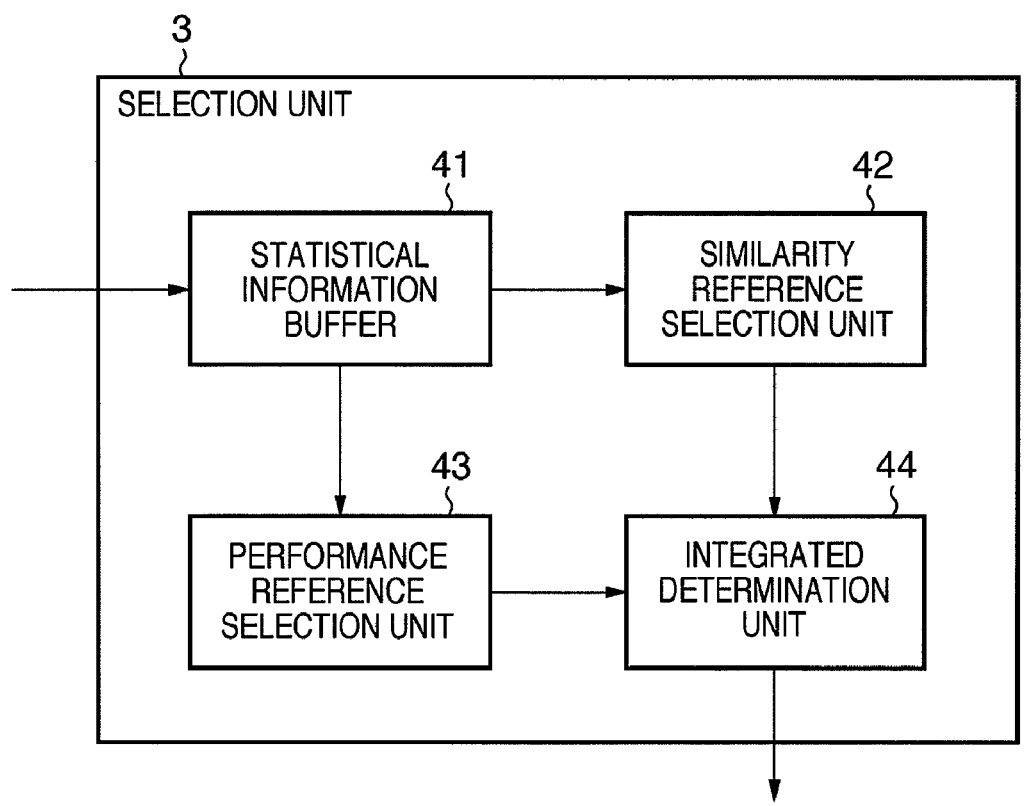
FIG. 7 is a block diagram showing an example of the arrangement of a selection unit.

FIG. 7 is a block diagram showing an example of the arrangement of the selection unit 3. The selection unit 3 includes a statistical information buffer 41, similarity reference selection unit 42, performance reference selection unit 43, and integrated determination unit 44.

The statistical information buffer 41 is a memory area used to temporarily hold pieces of statistical information of weak classifiers acquired from the statistical information holding unit 6. The similarity reference selection unit 42 calculates a degree of similarity between weak classifiers, and selects a weak classifier based on the calculation result. The performance reference selection unit 43 selects a weak classifier based on the characteristic evaluation value, that is, the performance of each weak classifier. The integrated determination unit 44 integrates the results of the similarity reference selection unit 42 and performance reference selection unit 43 to finally select weak classifiers to be composited.

Figure 8:
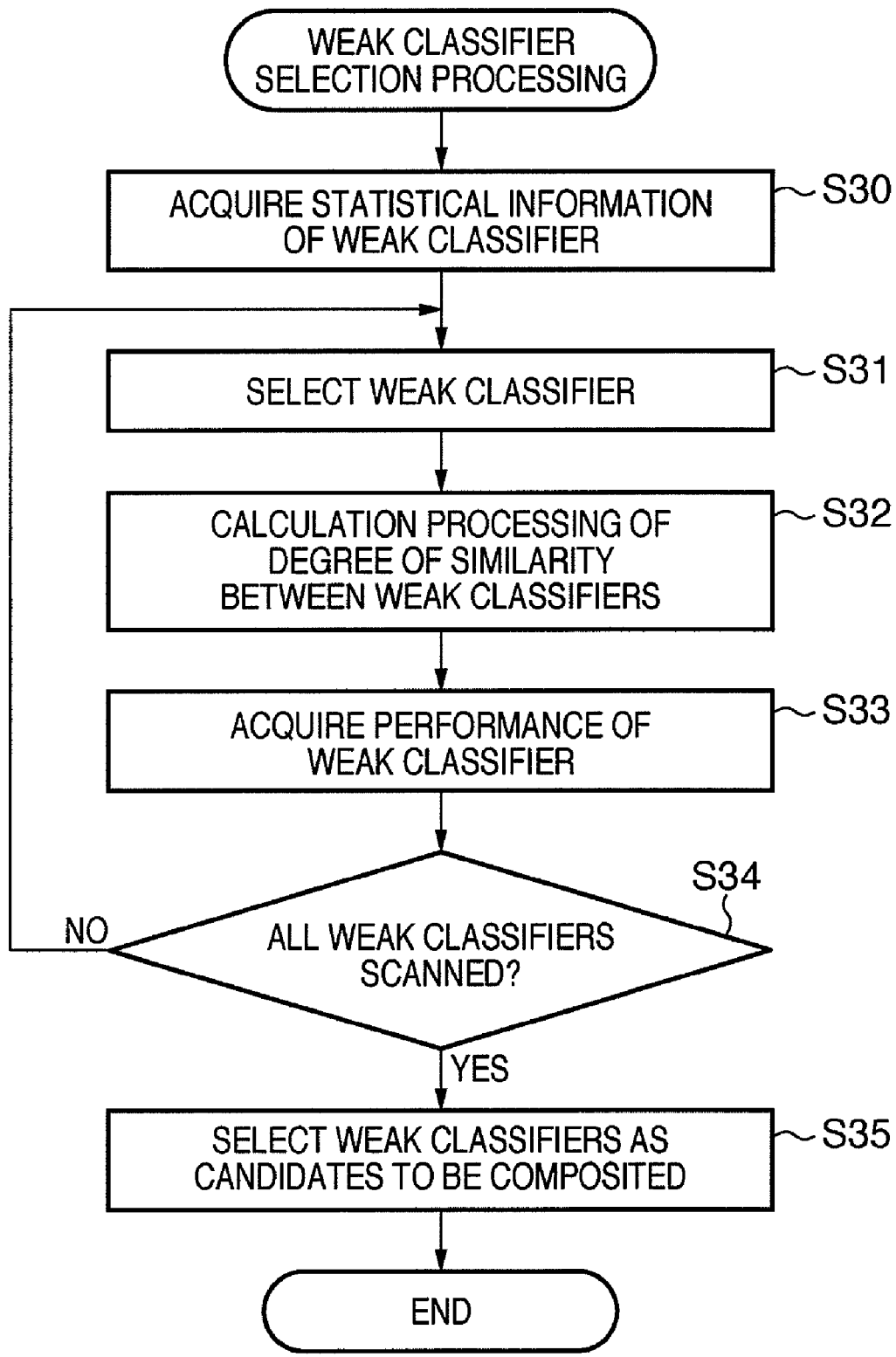
FIG. 8 is a flowchart showing an example of weak classifier selection processing.

FIG. 8 is a flowchart showing an example of the weak classifier selection processing in step S05 shown in FIG. 2. This processing is mainly executed by the selection unit 3.

The selection unit 3 acquires statistical information of a weak classifier from the statistical information buffer 41 (step S30). Next, the selection unit 3 selects a weak classifier as a calculation target of a degree of similarity and performance (step S31). In this step, the weak classifier which has already learned can be selected. The similarity reference selection unit 42 calculates degrees of similarity for all combinations of the weak classifier selected in step S31 and other weak classifiers which have already learned (step S32).

Figure 9:
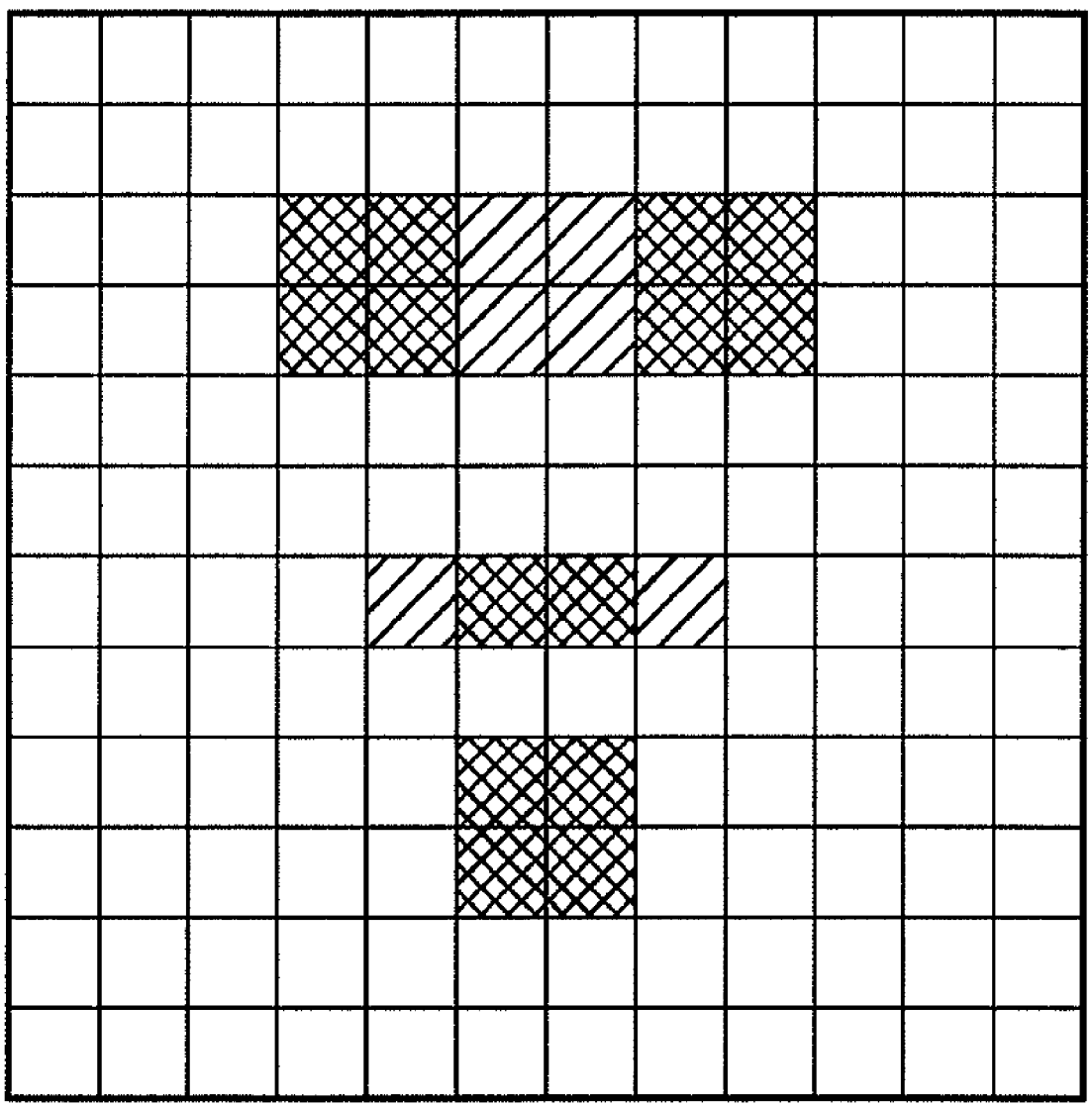
FIG. 9 is a view showing an example of a weak classifier filter structure.

A degree of similarity between weak classifiers is calculated as follows. FIG. 9 is a view of a weak classifier filter structure. A filter shown in FIG. 9 is expressed by 12×12 two-dimensional grids. Assume that a filter coefficient of grids painted in black is −1, that of hatched grids is +1, and that of other grids is 0. By expressing, using a one-dimensional vector, this filter expressed by the two-dimensional grids, a degree of similarity between weak classifier filters can be defined as an inner product between two vectors. Likewise, the degree of similarity can be defined as a Euclidean distance between two vectors. Furthermore, as a general distance, a Minkowski distance may be used as a definition. A Hausdorff distance described in reference 3 may be used as a definition.

Subsequently, the performance reference selection unit 43 acquires the characteristic evaluation value, that is, the performance of the weak classifier selected in step S31 (step S33). Note that the performance to be acquired of the weak classifier includes, for example, the weighted error ratio, abortion ratio, and the like with respect to the data for learning. Also, a detection time (processing time) may be used, and the filter structure of the weak classifier may be used without measuring the processing time. When the filter structure of a weak classifier becomes complex, since a processing time required for detection increases, the complexity of the filter structure is equivalent to an increase in processing time. Since the filter structure does not depend on a processing system unlike the detection time, it is effective when a processing system for learning is different from that for detection. In order to estimate the processing time based on the filter structure, the concept of the simplicity of the filter structure can be used. As described above, the processing time required for arithmetic operations is estimated using a definition that numerically converts the complexity of the filter structure, as described in reference 3. Typically, upon making arithmetic operations between a rectangular filter and image, how many pixels on the image are to be referred to is checked, and the number of reference points can be used as a guide for the simplicity of the filter structure.

Subsequently, the integrated determination unit 44 determines if acquisition of the degrees of similarity with other weak classifiers and performances is complete for all weak classifiers which have already learned (step S34). If acquisition is not complete yet, the process returns to step S31. If acquisition of the degrees of similarity and performances is complete for all weak classifiers, the integrated determination unit 44 determines weak classifiers to be composited, and selects weak classifiers (step S35). More specifically, the integrated determination unit 44 selects, from weak classifiers which have already learned, a weak classifier group in which weak classifiers each of which has a low performance as a weak classifier itself or which have similar filter structures continuously appear, or a weak classifier group in which weak classifiers exist at neighboring positions. A weak classifier having a low performance by itself may be selected as a composition target together with those before and after it. Furthermore, not only weak classifiers before and after the weak classifier of interest but also more weak classifiers may be selected according to performances. In this case, the relationship between the performances and a target range of weak classifiers to be composited may be held in advance in a table. For example, a composition range is determined in proportion to a lone performance of a weak classifier having a lowest performance. That is, when the lone performance of a weak classifier is low, the number of weak classifiers to be composited is set to be small. This is because when the lone performance is low, that performance is expected to be sufficiently improved if that weak classifier is composited with a small number of weak classifiers. Unlike the arrangement of this embodiment, several types of ranges of weak classifiers to be composited are prepared, the actual composition processing is repeated as many as the number of types, and the best result may be selected. Using the lone performance of a weak classifier as a criterion of composition, a weak classifier having a low lone performance is selected as a composition target, and composition with those before and after that weak classifier is promoted, thus increasing the possibility of creating a weak classifier having a higher performance.

As for selection of weak classifiers based on their filter structures, as described above, by selecting weak classifiers having similar structures, the number of redundant weak classifiers is reduced, thus expecting an effect of improving the efficiency of the overall detector. Conversely, a plurality of weak classifiers having filter structures which are not similar to each other may be selected. As a result, one weak classifier having a more effective filter structure can often be obtained by composition.

<Weak Classifier Composition Processing>

The weak classifier composition processing in step S06 shown in FIG. 2 will be described below.

Figure 10:
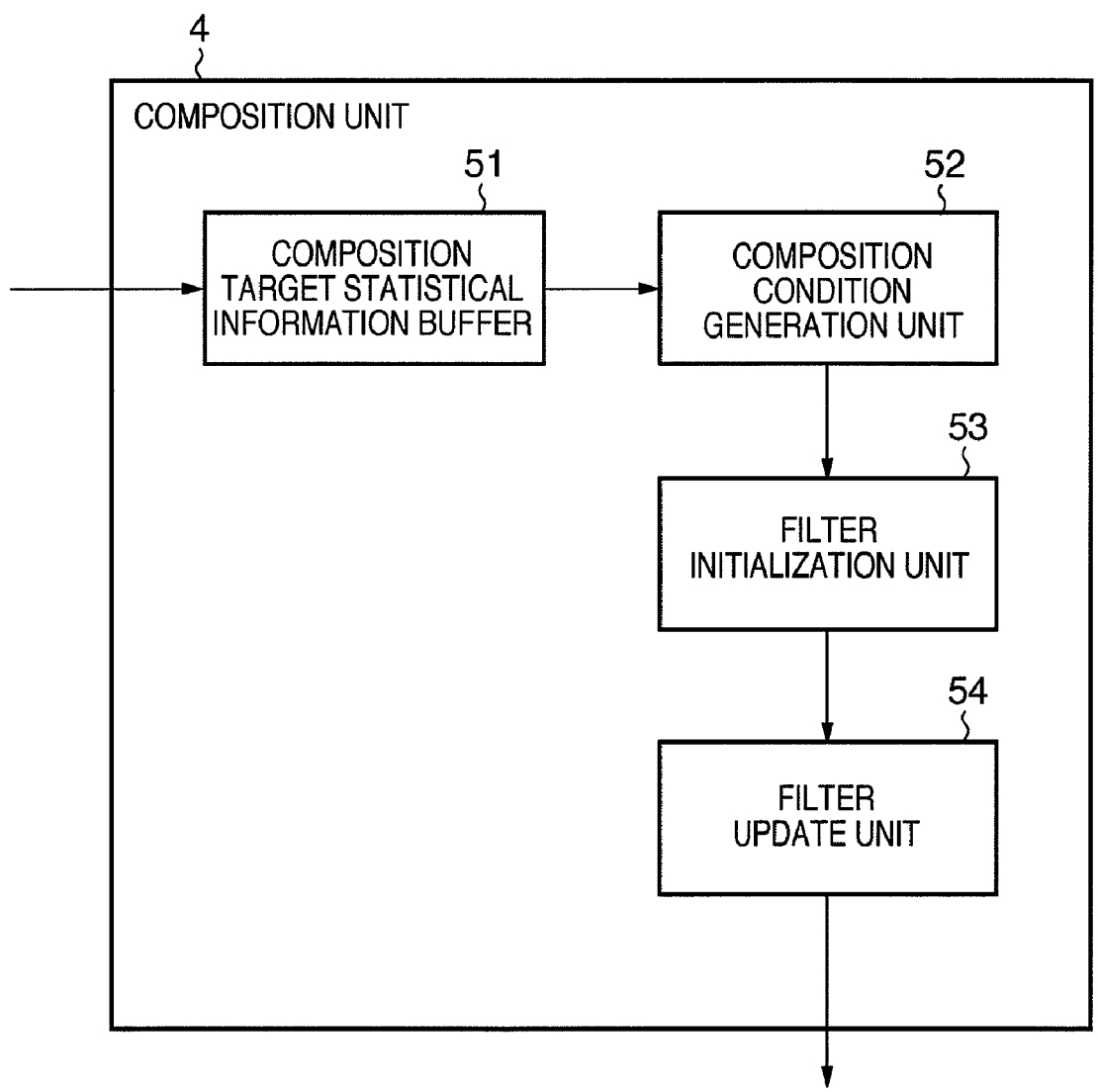
FIG. 10 is a block diagram showing an example of the arrangement of a composition unit.

FIG. 10 is a block diagram showing an example of the arrangement of the composition unit 4. The composition unit 4 includes a composition target statistical information buffer 51, composition condition generation unit 52, filter initialization unit 53, and filter update unit 54.

The composition target statistical information buffer 51 is a memory area used to temporarily store pieces of statistical information of weak classifiers selected by the selection unit 3. The composition condition generation unit 52 generates a condition to be satisfied by a weak classifier after composition. The filter initialization unit 53 initializes a filter of a weak classifier after composition. The filter update unit 54 updates the state of a weak classifier after composition to generate a weak classifier which satisfies the condition to be satisfied by the weak classifier, which condition is generated by the composition condition generation unit 52.

Figure 11:
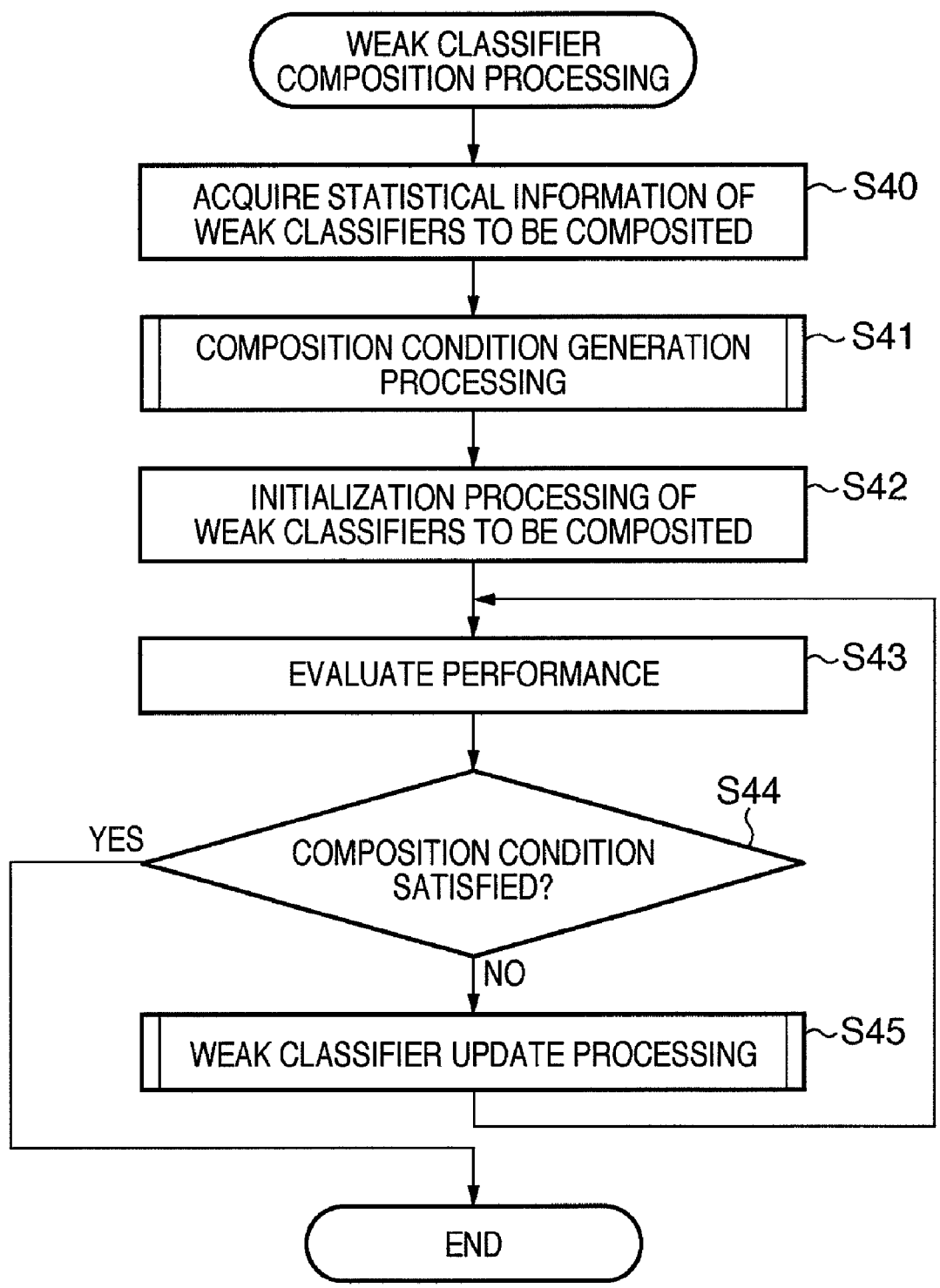
FIG. 11 is a flowchart showing an example of weak classifier composition processing.

FIG. 11 is a flowchart showing an example of the weak classifier composition processing in step S06 shown in FIG. 2. This processing is mainly executed by the composition unit 4.

The composition unit 4 acquires pieces of statistical information of weak classifiers from the composition target statistical information buffer 51 (step S40). The composition condition generation unit 52 generates a condition to be satisfied by a weak classifier after composition based on the statistical information of the weak classifiers (step S41). Note that the condition to be satisfied by the weak classifier after composition includes a first condition that the performance of the weak classifier after composition exceeds the accumulated performance of a plurality of weak classifier candidates before composition, that is, an accumulated characteristic evaluation value obtained by accumulating the characteristic evaluation values of these plurality of weak classifiers. Note that the performance of a weak classifier includes a correct answer ratio with respect to samples for learning or evaluation, a processing time such as a detection time, and an abortion ratio of aborting arithmetic operations during processing with respect to non-detection target data (non-face data in this case). In consideration of a case in which an apparatus for making learning (learner) is different from an apparatus for making detection (detector), as described above, the complexity of a filter of a weak classifier may be used as an index of the performance in place of a processing time. A second condition is that a weak classifier after composition similarly satisfies a dependence between weak classifiers as candidates to be composited and other weak classifiers. More specifically, such dependence includes weights of data for learning of weak classifiers before composition. As described above, upon making learning based on a framework of Adaboost, a weak classifier has a dependence on a (previous) weak classifier in a preceding stage. A weight of an image which cannot be detected or is erroneously detected by a weak classifier in the preceding stage is increased, and is used in learning of the next weak classifier. Hence, each weak classifier depends on a weak classifier in the preceding stage. Upon compositing weak classifiers, consistency of the detector as a whole is lost unless the dependence between weak classifiers is maintained. Hence, as a constraint condition at the time of execution of weak classifier composition, a condition that the dependence between weak classifiers, that is, the weights of data for learning are maintained. More specifically, the weights of data for learning based on the learning result of a weak classifier, which is located in a rearmost (later) order of a plurality of selected weak classifier candidates to be composited, nearly match those of data for learning of the weak classifier after composition, that is, a difference between them falls within a predetermined range.

More specifically, the second condition can be expressed as follows. When a weight of data for learning is expressed as a one-dimensional vector, and weights of data for learning of weak classifiers before and after composition are compared, their difference has to fall within a predetermined range. This can be described as:

$$\|W_{before\ composition} - W_{after\ composition}\| \leq \epsilon \qquad (6)$$

where ε is a predetermined positive value. The left-hand side represents a distance between the two weighting vectors. A definition of this distance may use a so-called Euclidean distance or a general Minkowski distance. In place of the distance, a degree of similarity between weighting vectors based on an inner product may be used as a measure of matching.

Note that the case in which the framework of Adaboost is used in learning of weak classifiers has been explained. However, the framework may be transcended or may not be maintained in the composition processing. That is, a method that does not maintain the dependence between weak classifiers in the composition processing may be used. This is the case when only the first condition is satisfied and the second condition is not satisfied. In this case, although the dependence between weak classifiers is not maintained, the performance of the detector as a whole is improved, thus consequently configuring a desirable detector.

Even when the composition processing is executed to satisfy the second condition, if the detection performance as a whole is improved even though the dependence is not strictly maintained, the intended purpose is achieved. Therefore, an arrangement that relaxes the second condition may be adopted. In this case, for example, a simplified condition in which the weights of only face data of data for learning are roughly matched (non-face data are not evaluated) may be used. Also, the weights of only evaluation data which are decided to be important before learning may be roughly matched.

The description will revert to that of the composition processing sequence. After the composition condition is generated, the filter initialization unit 53 initializes weak classifiers as candidates to be composited (step S42). The filter initialization unit 53 mainly initializes the filter structures and thresholds of weak classifiers. An initial value of the filter structures of weak classifiers as candidates to be composited is decided to obtain a weak classifier which satisfies the composition condition obtained in step S41. The initial value of a filter may be completely randomly decided. However, for example, the filter structures of weak classifiers as candidates to be composited may be superimposed and arranged.

Figure 12:
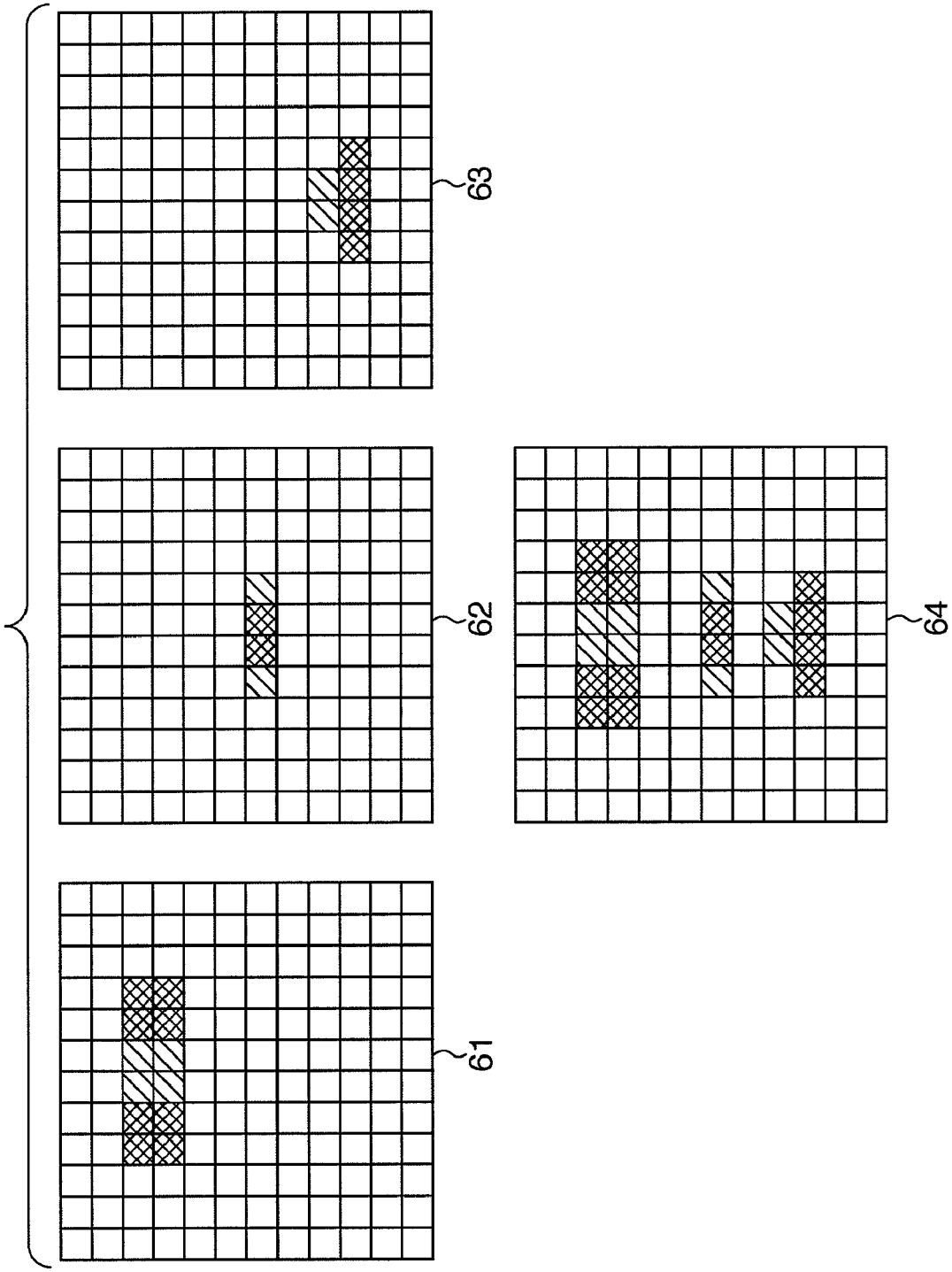
FIG. 12 is a view showing an example of superimposition of filter structures.

FIG. 12 is a view illustrating an example of superimposition of the filter structures. A filter structure 64 is obtained when filter structures 61, 62, and 63 of weak classifiers as candidates to be composited are simply superimposed. By applying an initial value that reflects the filter structures of weak classifiers as candidates to be composited to a weak classifier after composition, a more suitable composite weak classifier can often be obtained in the weak classifier update processing to be described later. In place of simple superimposition, weighted superimposition according to the performances of weak classifiers as candidates to be composited may be done. More specifically, for example, when the performance of the filter structure 62 of the filter structures 61, 62, and 63 of the weak classifiers as candidates to be composited shown in FIG. 12 is low, the filter structure 62 is prevented from being reflected to the initial value. Although not shown in FIG. 12, when the filter structures of weak classifiers as candidates to be composited have a competing positional relationship, an initial layout may be decided based on the performances of the weak classifiers. More specifically, this is the case when rectangular filters are included in an identical region. In this case, which of filter structures is preferentially reflected to the initial value is decided based on the performances (e.g., the characteristic evaluation values) of the corresponding weak classifiers. Note that the filter structure to be preferentially used may be decided in consideration of the learning results of weak classifiers based on the weights assigned to data for learning used in learning (for example, a detection error of data for learning with a large weight is output). Initialization of a threshold can be decided in the same sequence as that described in learning of Adaboost after the filter structures are initialized.

Principal component analysis or independent component analysis may be used in initialization of the filter structure of a composite weak classifier. For example, a principal component (eigenvector corresponding to a maximum eigenvalue) of a variance-covariance matrix obtained by expressing the filter structures of a plurality of weak classifiers as candidates to be composited by vectors can be used as an initial value. Likewise, independent component analysis is applied to the filter structures, and one of independent components or superimposition of a predetermined number of independent components can also be used as an initial value.

The description will revert to that of the composition processing sequence. The filter update unit 54 then evaluates the performance of the composite weak classifier after the initialization (step S43). Note that the performance evaluation may use samples for learning used in the subsequent weak classifier update processing or samples for evaluation exclusively used for the performance evaluation. In the processing in step S43, performance information required to determine the composition condition obtained in step S41 is calculated. For example, a detection ratio, processing time, and the like are calculated. In consideration of a case in which a learner and detector are different, the complexity of the filter structure may be evaluated in place of the detection time.

The filter update unit 54 then determines based on the performance information obtained in step S43 if the composition condition is satisfied (step S44). If the condition is satisfied, the composition processing ends. If the condition is not satisfied, the filter update unit 54 executes weak classifier state update processing. After the weak classifier state update processing, the performance evaluation and condition determination are repetitively executed until the predetermined condition is satisfied.

Note that composition of weak classifiers is less than successful, and the repetition processing may not end depending on the condition. In this case, a predetermined upper limit on the number of repetitions may be set, and when the number of repetitions reaches that upper limit, the composition processing may be aborted, and weak classifier candidates to be composited which are closest to the condition at that time may be selected as composition targets. Alternatively, the composition processing may be aborted, and the process may return to normal weak classifier learning processing. For example, after a normal weak classifier is generated, that weak classifier may be added as a new candidate, and composition targets may be selected again, thus executing the processing of the composite weak classifier again. When a new composition target is added or replaces that at the time of previous composition, the weak classifier composition processing may often work out.

The weak classifier update processing in step S45 shown in FIG. 11 will be described below with reference to FIG. 13. Note that the weak classifier state update processing is processing for updating the rectangular filter structure to satisfy the composition condition, and has the same issue as general optimization. Therefore, a state-of-the-art technique may be used as long as an object can be achieved. For example, an element called a granule of a rectangular filter may be introduced, and an optimal filter structure may be found out by a heuristic search method, as described in reference 3. Likewise, an evaluation function used to evaluate the composition condition may be introduced, and a general optimization method may be applied to optimal structure search of a composite filter structure. A case will be described below wherein a Markov Chain Monte Carlo method as one optimization method is applied to the weak classifier state update processing.

Figure 13:
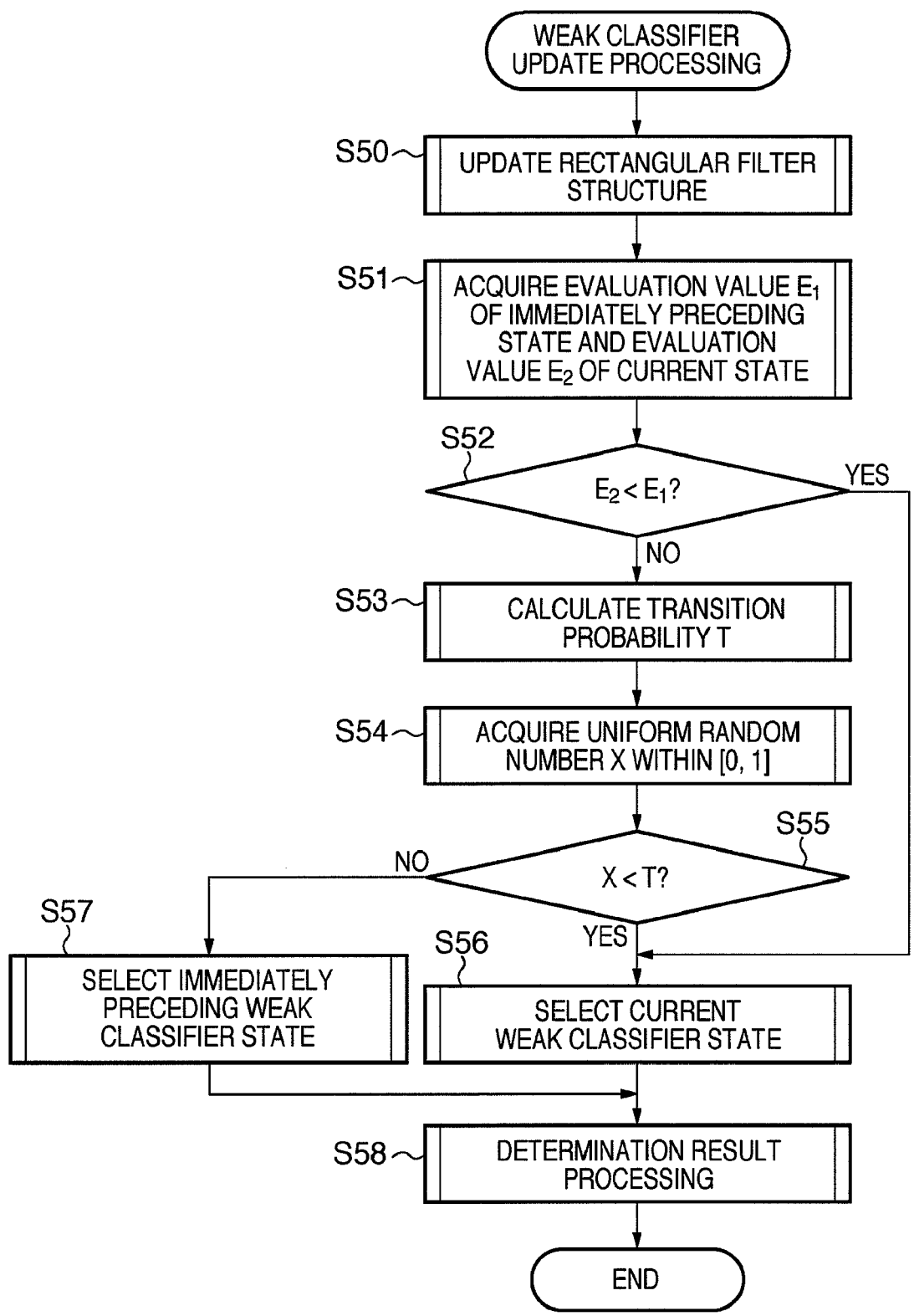
FIG. 13 is a flowchart showing an example of weak classifier update processing.

FIG. 13 is a flowchart showing an example of the weak classifier state update processing upon application of the Markov Chain Monte Carlo method.

The filter update unit 54 updates a rectangular filter structure (step S50). Several rectangular filter update methods are known, and a random update method can be typically used. The update method will be practically explained below.

The filter update unit 54 selects a filter position to be updated from the rectangular filter of the weak classifier shown in FIG. 9 above. This selection may be randomly made. In case of FIG. 9, a position to be updated is randomly selected from 12×12 grids.

After the update position is selected, the filter update unit 54 updates a value of the rectangular filter at that position. If values that the filter can assume are two values, the other value can be simply set. If the filter can assume integer values of three values or more, a value at the update position is randomly updated. For example, if the filter can assume N values, and a value of the filter before update is n, a value after update other than n is randomly selected from N-1 different values. When a filter value is not an integer value but a real number value, an update method using a random number can be similarly applied. In this case, a uniform random number may be generated between upper and lower limit values of the filter, and may be adopted as a filter value after update. Note that the filter may be updated at a large granularity. That is, filter values at neighboring positions of the randomly selected update position may be updated at the same time. In this case, a filter range which is updated at the same time is arbitrary, and the weak classifier performance evaluation result may be reflected. That is, when the performance is high to some extent, the filter range to be updated at the same time is narrowed down; when the performance is low, the filter range to be updated at the same time is broadened.

The filter update unit 54 calculates an evaluation function E having states of a weak classifier as vector elements (step S51). In this case, a calculation is made for an immediately preceding weak classifier state ($E_1$) and current weak classifier state ($E_2$). The evaluation function E is required to change its definition as needed depending on the composition condition, and is typically given by:

$$E = -\alpha C - \beta P \tag{7}$$

where C is a reciprocal of the detection time as the evaluation result of the performance evaluation unit 5, and P is the detection performance as the evaluation result of the performance evaluation unit 5. More specifically, P is the weighted error ratio with respect to samples for learning or evaluation. α and β are coefficients which assume values equal to or larger than zero, and predetermined values are used. In this case, either α or β may assume zero, but they do not assume zero at the same time. C and P represent the performance of the weak classifier (they can only assume positive values). Since these values are multiplied by the positive coefficients α and β and are subtracted from E, the value E becomes smaller as the reciprocal C of the detection time is larger (the detection time is shorter) or as the detection performance P is higher (larger). That is, the value E can be reduced as the detection performance of the weak classifier is higher or the detection time is shorter.

The filter update unit 54 determines which of the values E in the immediately preceding state and current state becomes smaller (step S52) If the current weak classifier state makes the value E be smaller than the immediately preceding state (YES in step S52), the filter update unit 54 selects the current weak classifier state. Conversely, if the current weak classifier state makes the value E be larger than the immediately preceding state (NO in step S52), the filter update unit 54 calculates a transition probability T required to select the current state at a given probability in place of the immediately preceding state (step S53). The transition probability T is given by:

$$T = \exp(-(E_2 - E_1)/t) \tag{8}$$

where $E_1$ is the value of the evaluation function in the immediately preceding state, and $E_2$ is the value of the evaluation function in the current state. t is a parameter used to control the state transition of the weak classifier, and assumes an arbitrary value larger than zero.

Subsequently, the filter update unit 54 acquires a uniform random number X within a range [0, 1] (step S54), and compares the transition probability T calculated in step S53 with the value of the uniform random number X acquired in step S54 (step S55). As a result, if the value T is larger than X (YES in step S55), the filter update unit 54 selects the current weak classifier state (step S56). On the other hand, if the value T is equal to or smaller than X (NO in step S55), the filter update unit 54 selects the immediately preceding weak classifier state (step S57). Finally, the filter update unit 54 outputs a selection result of the immediately preceding or current weak classifier state (step S58.

With the above processing, the weak classifier state having a worse value of the evaluation function E than the immediately preceding weak classifier state is accepted at a given ratio (every given number of selection times). If the parameter t used to control the ratio assumes a large value, a probability to accept the current state even when the evaluation function E is worse than the immediately preceding state increases, and the state transition becomes easier to take place. Conversely, if the value t is small, when the value of the evaluation function E is worse than the immediately preceding state, the state transmission becomes harder to take place. Even when the value of the evaluation function E is large, since a state change is accepted to some extent, the value of the evaluation function E can have a chance to escape from a local minimum.

An optimal weak classifier may be searched by sequentially changing the value t. Typically, a large value t is initially set, and evaluation is repeated while gradually decreasing the value t. As is known, this is a method called simulated annealing, and is effective for an optimal value search problem.

In the description of FIG. 13, the Monte Carlo method is used as the weak classifier update method. However, this processing is not limited to a specific optimization method, and various other optimization methods can be applied to a filter structure search problem.

As described above, according to the first embodiment, after weak classifiers each having a relatively simple filter structure are learned, they are composited to generate a weak classifier having a complicated filter structure. As a result, a weak classifier having a complicated filter structure need not be searched from the early period of learning, thus greatly shortening the learning time. Note that the learning time can also be greatly shortened by devising the weak classifier composition algorithm.

Also, according to the first embodiment, the weak classifier composition processing is executed under the condition (especially, the first condition) to be satisfied by the weak classifier after composition. As a result, the performance (for example, the detection ratio and detection time) of the detector as a whole can be improved compared to that before composition.

(Second Embodiment)

The second embodiment will be described below. The second embodiment will explain a case in which composition of weak classifiers is introduced at the time of normal weak classifier learning to search for effective weak classifiers. In the second embodiment, the relationship between the weak classifier learning processing and weak classifier composition processing is different from the first embodiment described above. More specifically, in the first embodiment, when learning of weak classifiers is completed in a general way (for example, when the predetermined number of weak classifiers is reached or when the performance of the detector as a whole reaches a goal), weak classifiers as candidates to be composited are selected, and undergo composition processing. By contrast, in the second embodiment, after completion of learning of weak classifiers, weak classifiers are selected at a predetermined timing, and undergo composition processing.

Note that a repetitive description of the same part as in the first embodiment will be avoided in the following description. The arrangement of the learning apparatus 100 according to the second embodiment is the same as that shown in FIG. 1 used to describe the first embodiment.

<Overall Sequence>

Figure 14:
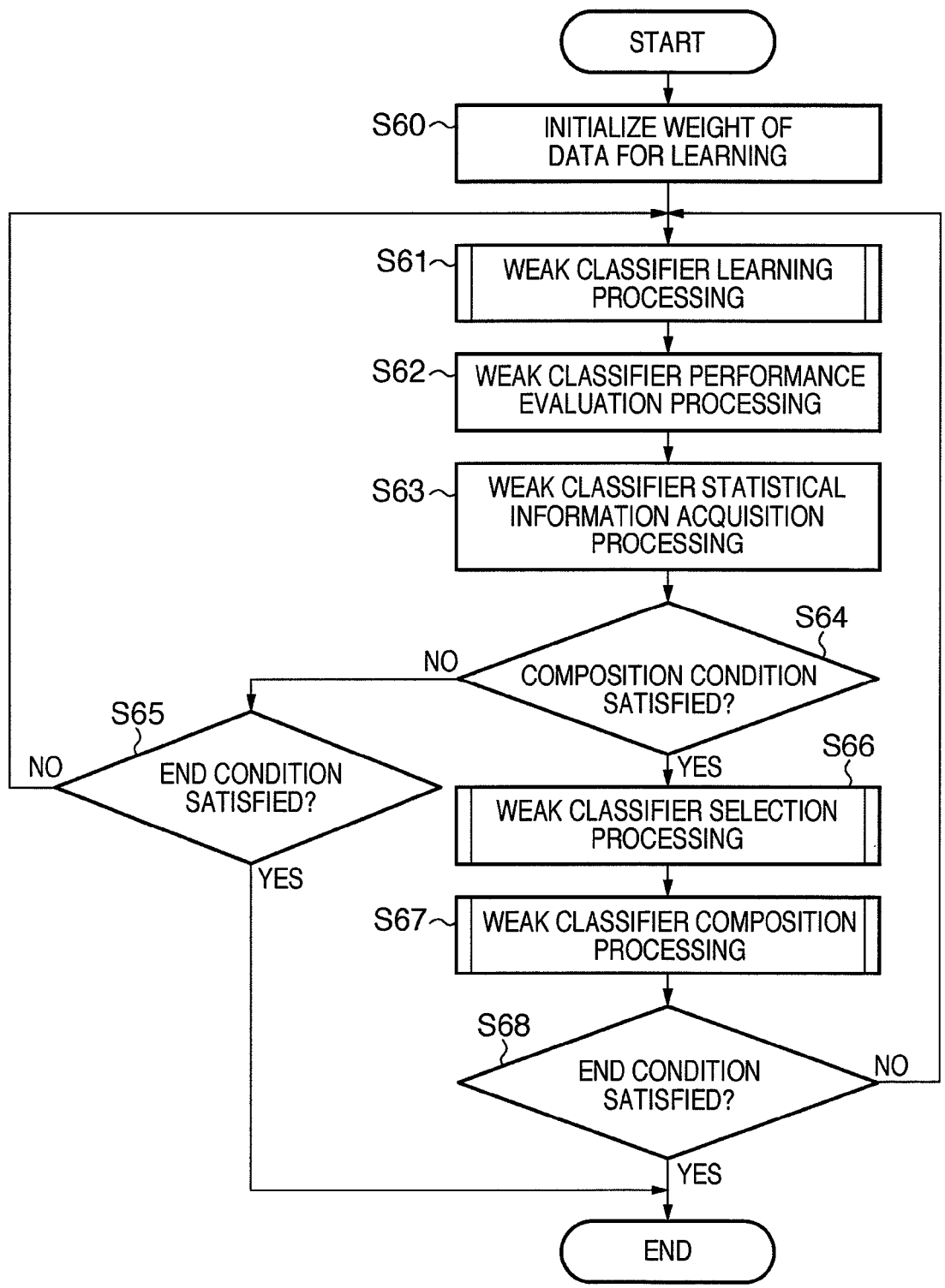
FIG. 14 is a flowchart showing an example of the overall processing in a learning apparatus according to the second embodiment.

FIG. 14 is a flowchart showing an example of the overall processing in the learning apparatus 100 according to the second embodiment.

The learning apparatus 100 initializes weights of data for learning (step S60). The learning apparatus 100 then executes weak classifier learning processing (step S61). The learning apparatus 100 evaluates the performance of a weak classifier (step S62), and acquires and holds statistical information such as a structure and performance of the weak classifier (step S63).

Subsequently, the learning apparatus 100 determines whether or not to composite weak classifiers based on a predetermined condition (step S64). If the predetermined condition is satisfied, the learning apparatus 100 interrupts learning of weak classifiers, and starts weak classifier composition processing. If the predetermined condition is not satisfied, the learning apparatus 100 determines whether or not to continue learning of weak classifiers (step S65). The learning end condition includes a condition as to whether or not a predetermined number of weak classifiers are generated, that as to whether or not the performance of the detector as a whole including a plurality of weak classifiers reaches that as the goal, and so forth. If the end condition is satisfied, the learning apparatus 100 ends this processing. If the end condition is not satisfied, the process returns to step S61, and the learning apparatus 100 continues to learn subsequent weak classifiers.

Note that the predetermined condition is not satisfied in step S64, for example, when weak classifiers which have already learned do not reach a predetermined performance, and when the complexity of weak classifiers falls below a given level. This determination is made for one or a plurality of weak classifiers.

Note that every time a predetermined number of weak classifiers are generated, they may be composited independently of the performance. In this case, since the number of weak classifiers to be composited becomes constant, a merit that an algorithm for weak classifier composition need not be so complicated can be provided.

The composition timing may be changed depending on the number of weak classifiers which have already learned. That is, a larger number of weak classifiers are composited together in latter stages. In general, when weak classifiers are composited, the structure of a rectangular filter becomes complicated, and the processing time tends to increase. When more weak classifiers are expressed by one weak classifier, the complexity tends to further increase. For this reason, when a cascade-connection type detector is configured, if it includes a complicated weak classifier in a former stage, the detection time is likely to increase as a whole. In order to avoid this problem, for example, former weak classifiers in the cascade connection are not composited to have simple structures, and weak classifiers in latter stages are frequently composited to provide weak classifiers which are complicated but have high performances. From which stage composition of weak classifiers is executed may be held in, for example, a table in advance, and the composition timing may be decided with reference to that table. More preferably, processing for dynamically searching for a point at which the overall processing time is reduced even when a complicated weak classifier is generated by composition by estimating the performance of the detector such as an abortion ratio and detection time at the time of learning of weak classifiers may be adopted. A known optimization algorithm can be applied to such search problem.

The description will revert to that of the processing sequence. If the composition condition is satisfied in step S64, the learning apparatus 100 selects weak classifiers to be composited (step S66) and composites the selected weak classifiers (step S67). Note that in the second embodiment, the dependence between weak classifiers need not be maintained upon composition unlike in the first embodiment. For this reason, since a constraint condition upon execution of composition need not to include that condition, it generally allows easier composition, and makes a contribution to shorten the learning time.

After the weak classifier composition processing, the learning apparatus 100 determines whether or not the end condition is satisfied (step S68). This determination process is the same as that in step S65, and it is determined whether or not the detector as a whole reaches a sufficient performance and so forth. If the condition is satisfied, the learning apparatus 100 ends the learning processing. If the condition is not satisfied, the process returns to step S61, and the learning apparatus 100 continues to learn weak classifiers.

As described above, according to the second embodiment, learning of weak classifiers in stages after those to be composited has not been done yet upon composition. As a result, the dependence need not be maintained upon composition unlike in the first embodiment.

(Third Embodiment)

Figure 15:
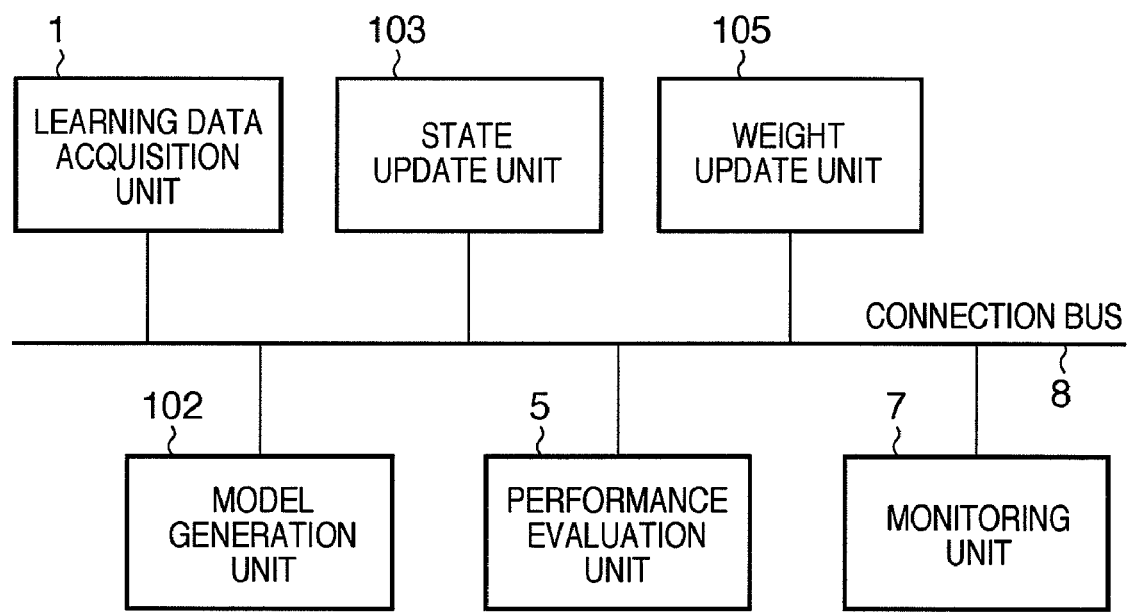
FIG. 15 is a block diagram showing an example of the arrangement of a learning apparatus according to the third embodiment.

The third embodiment will be described below. FIG. 15 is a block diagram showing an example of the arrangement of a learning apparatus 100 for a pattern detector according to the third embodiment. Note that the same reference numerals denote the same components as in FIG. 1 described above. An arrangement different from FIG. 1 will be mainly described.

The learning apparatus 100 according to the third embodiment includes a learning data acquisition unit 1, model generation unit 102, state update unit 103, performance evaluation unit 5, and weight update unit 105. Also, the learning apparatus 100 includes a bus 8 used to attain control/data connections among respective units, and a monitoring unit 7 used to monitor the state of learning. The learning data acquisition unit 1, model generation unit 102, state update unit 103, performance evaluation unit 5, and weight update unit 105 are configured by, for example, a dedicated circuit group such as an ASIC (Application Specific Integrated Circuit). These units may also be configured by, for example, a processor (a reconfigurable processor, DSP (Digital Signal Processor), CPU, or the like). Furthermore, these units may be implemented as a program executed by a single dedicated circuit or versatile circuit (for example, a CPU).

The model generation unit 102 executes generation processing of a model of a weak classifier. Details of the model to be generated and that processing will be described later.

The state update unit 103 executes state update processing of a weak classifier. Details of the state of a weak classifier and the state update processing will be described later.

The performance evaluation unit 5 executes performance evaluation of a new weak classifier updated by the state update unit 103. The performance evaluation is done using data for learning acquired by the learning data acquisition unit 1. Details of practical evaluation processing and an evaluation function will be described later.

The weight update unit 105 updates ratios of the data for learning acquired by the learning data acquisition unit 1. The ratio update criterion depends on the evaluation result of the performance evaluation unit 5. Note that details will be described later.

<Overall Sequence>

Figure 16:
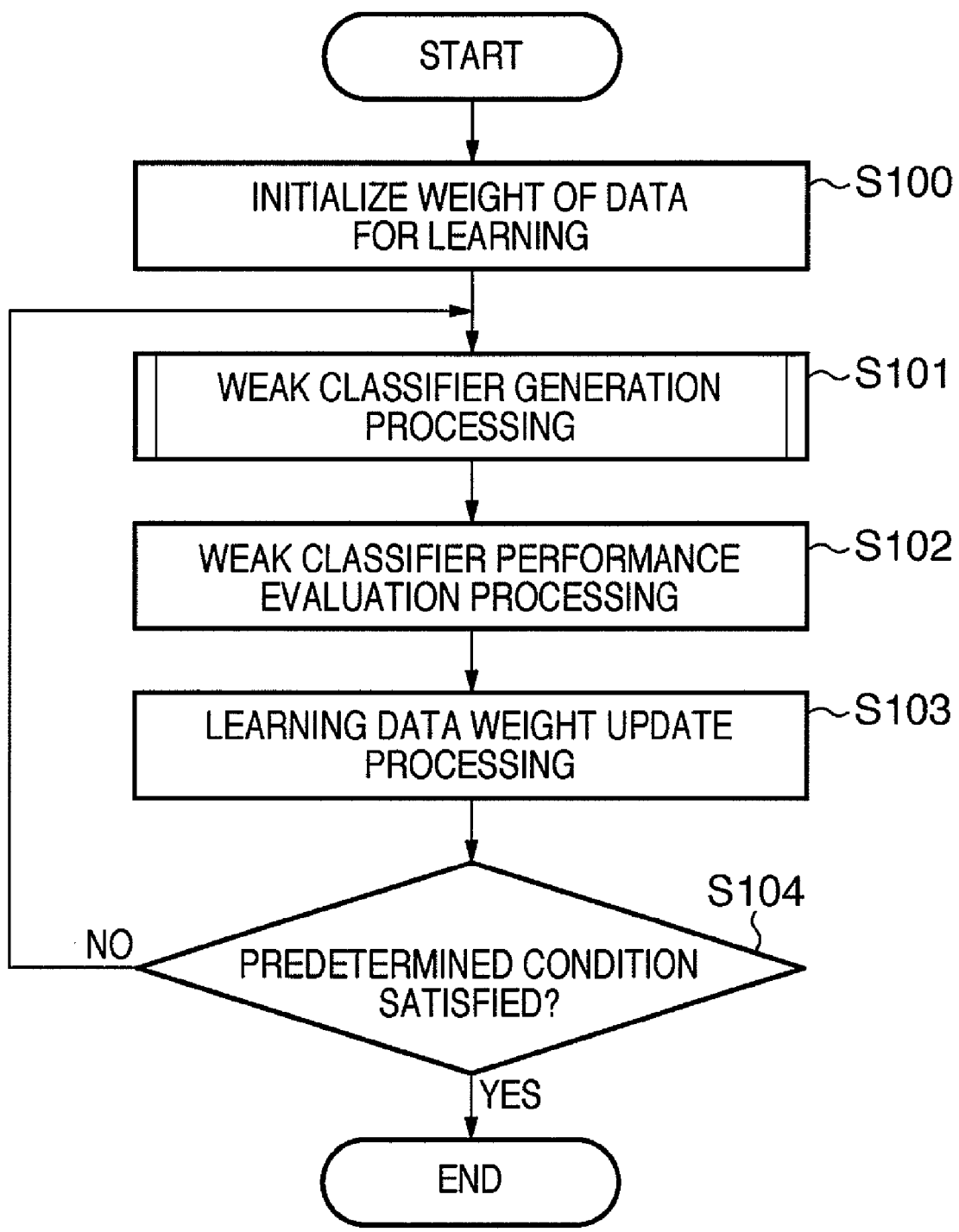
FIG. 16 is a flowchart showing an example of the overall processing in the learning apparatus.

FIG. 16 is a flowchart showing an example of the overall processing according to the third embodiment. The sequence of processing executed when the learning apparatus 100 builds a detector which detects a specific pattern from data for learning will be described below with reference to FIG. 16. A case will be exemplified below wherein data for learning are images, and a specific pattern to be detected is a human face.

The learning apparatus 100 initializes weights of data for learning (step S100). Then, the learning apparatus 100 executes weak classifier generation processing (step S101). In this step, a series of processes from candidate selection of a weak classifier until threshold decision of the weak classifier are executed, and one weak classifier is generated.

The learning apparatus 100 then evaluates the performance of the weak classifier generated in step S101 (step S102). Note that the data for learning used in the evaluation are selected based on their weights. In this step, a detection time may also be evaluated in addition to a correct answer ratio and error detection ratio.

Upon completion of generation and evaluation of the weak classifier, the learning apparatus 100 updates the weights of the data for learning based on the performance evaluation result of the weak classifier (step S103). As the update method, for example, a method described in reference 1 may be used. Typically, processing for increasing weights of face images which are not detected and non-face images which are erroneously determined as faces, and relatively decreasing weights of face images which are correctly detected and non-face images which are not determined as faces in the performance evaluation in step S102 is executed. As a result, a weak classifier which learns next can make learning focused on images that the previous weak classifier is not good at, and a detector having a high detection performance as a whole can be configured.

Upon completion of the weight update processing, the learning apparatus 100 determines if predetermined conditions are satisfied (step S104). The predetermined conditions include a condition as to whether or not the number of generated weak classifiers reaches a predetermined value, that as to whether or not the detection performance with respect to the data for learning reaches a predetermined criterion, and so forth. The overall processing sequence in the learning apparatus 100 according to this embodiment has been described.

<Weak Classifier Generation Processing>

Figure 17:
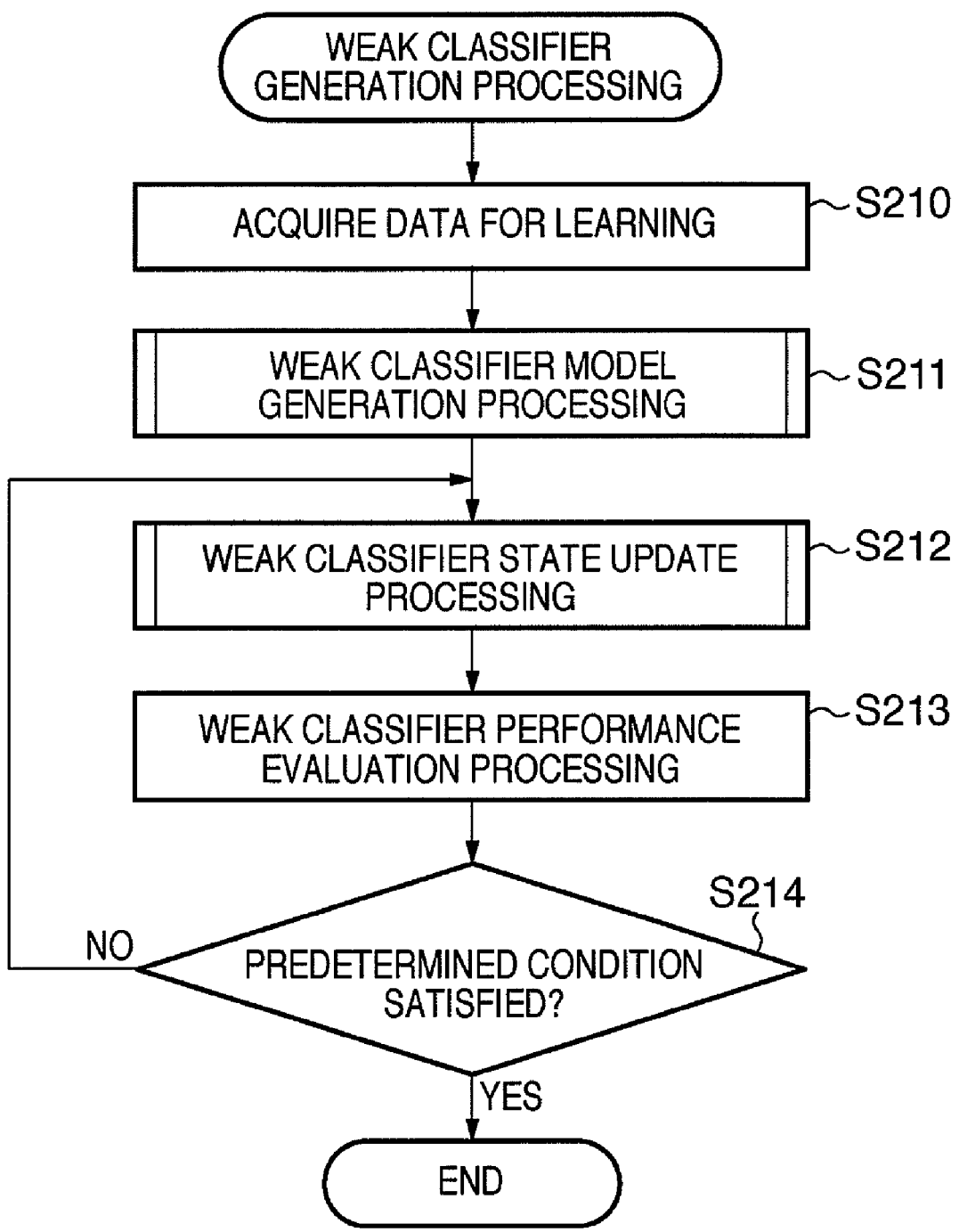
FIG. 17 is a flowchart showing an example of weak classifier generation processing.

The weak classifier generation processing in step S101 shown in FIG. 16 will be described below. FIG. 17 is a flowchart showing an example of the weak classifier generation processing.

In the learning apparatus 100, the learning data acquisition unit 1 acquires data for learning (step S210). The data for learning are weighted, as described above, and the contents of the data for learning change depending on weak classifiers which learn them.

In the learning apparatus 100, the model generation unit executes the weak classifier model generation processing (step S211). The model of a weak classifier is generated using statistical natures and structures of the data for learning. When the weak classifier model is generated based on the data for learning, every time a new weak classifier learns, since the weights of the data for learning change, the weak classifier model also changes. The contents of the practical processing of weak classifier model generation will be described later.

Upon completion of generation of the weak classifier model, the state update unit 103 executes the weak classifier state update processing (step S212). The state of the weak classifier indicates a combination of state parameters that characterize the weak classifier such as the number, positions, sizes, shapes, coefficients, and determination thresholds of rectangular filters, an abort threshold, and a voting ratio, in case of a weak classifier described in, for example, reference 1. These state parameters are those associated with an arithmetic operation region which is to undergo arithmetic operations so as to detect a specific pattern from the data for learning. Upon updating the state of the weak classifier, the result of the weak classifier performance evaluation processing (step S213 to be described later) as the subsequent processing is used. Note that when the state of the weak classifier is updated for the first time after the model generation processing (when the performance evaluation has never been executed), the state may be updated to be the same as that of the weak classifier model obtained from the model generation processing. Of course, the state may be updated by applying predetermined modifications to the state of that model. Note that the predetermined modifications include, for example, a modification of a filter shape using a random number, and the like.

After the weak classifier state update processing, the performance evaluation unit 5 executes performance evaluation using the updated weak classifier (step S213). In the performance evaluation, actual detection processing is executed using the data for learning, and a detection performance, processing time, and the like of the detection processing are evaluated. As the detection performance, a weighted detection ratio may be calculated using weights assigned in advance to the data for learning in place of a simple detection ratio. As a result, the detection performance evaluation focused on data which are hard to be detected (for example, with large weights) can be made. As for detection time, a weighted detection time may be similarly calculated.

After the performance evaluation, the learning apparatus 100 determines if the performance of that weak classifier satisfies a predetermined condition (step S214). If the predetermined condition is not satisfied, the process returns to the weak classifier state update processing in step S212 so as to update the state of the weak classifier. If the predetermined condition is satisfied, it is determined that the weak classifier suited to the data for learning acquired in step S210 is generated, thus ending the weak classifier generation processing. Note that the predetermined condition in step S214 includes the detection performance, detection time, and the like of the weak classifier itself with respect to the data for learning. Note that the value of an evaluation function, which is introduced in weak classifier state update processing (to be described later) and is to be satisfied by the weak classifier itself, may be used. The sequence of the weak classifier generation processing has been described.

<Weak Classifier Model Generation Processing>

Figure 18:
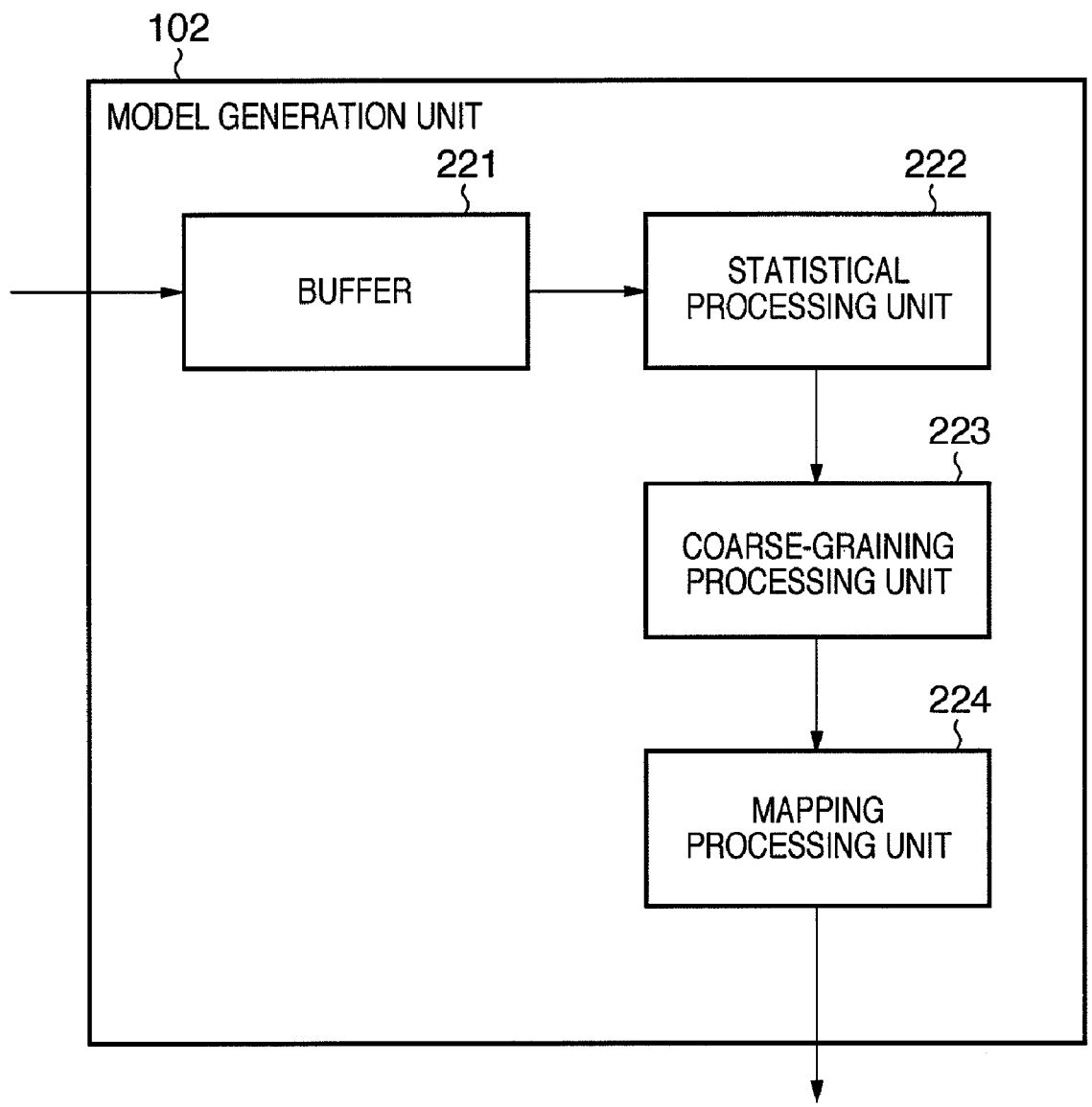
FIG. 18 is a block diagram showing an example of the arrangement of a model generation unit.

The weak classifier model generation processing in step S211 shown in FIG. 17 will be described below. FIG. 18 is a block diagram showing an example of the arrangement of the model generation unit 102.

The model generation unit 102 includes a buffer 221, statistical processing unit 222, coarse-graining processing unit 223, and mapping processing unit 224. The buffer 221 is a memory area used to temporarily hold data for learning. The statistical processing unit 222 executes statistical processing for the data for learning (images in this embodiment). The coarse-graining processing unit 223 executes coarse-graining processing of images. The mapping processing unit 224 executes mapping of the coarse-grained image data to a weak classifier model.

Figure 19:
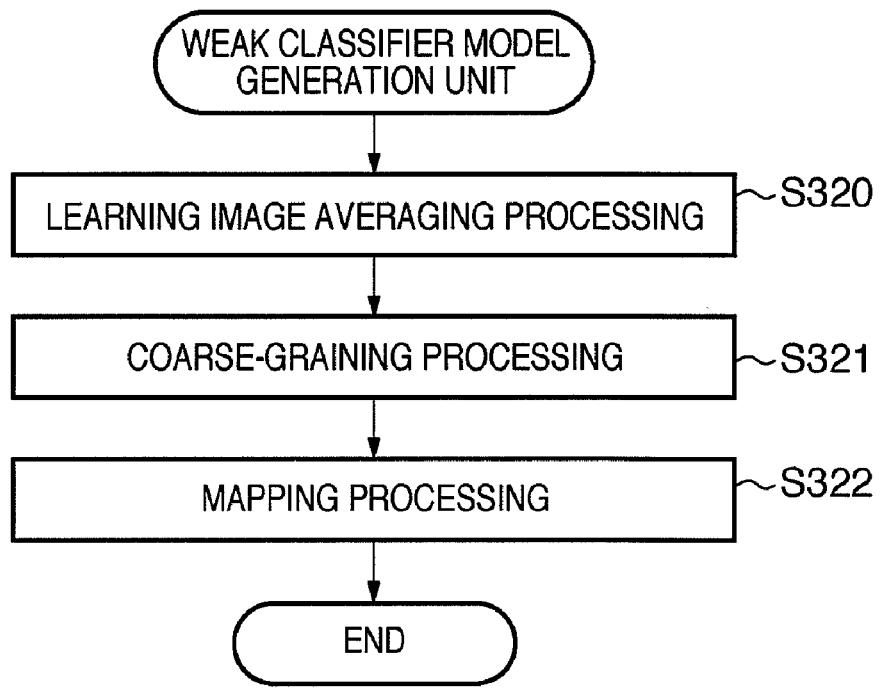
FIG. 19 is a flowchart showing an example of weak classifier model generation processing.

FIG. 19 is a flowchart showing an example of the weak classifier model generation processing in step S211 shown in FIG. 17. This processing is mainly executed by the model generation unit 102.

The model generation unit 102 selects the data for learning held on the buffer 221, that is, images having patterns to be detected (face images in this embodiment). The model generation unit 102 generates an image (to be referred to as an average face image hereinafter) by applying average processing to these images (correct answer images) (step S320). Upon generation of the average face image, an average may be calculated according to the weights of the data for learning. By generating the average face image by averaging images according to the weights of the data for learning, a weak classifier model according to the degrees of importance of the data for learning can be generated.

The model generation unit 102 then executes processing for coarse-graining the average face image (step S321). Note that the "coarse-graining" means, for example, mosaic processing for an image. For example, all pixels in a certain block are replaced by an average value or representative value of the pixels in that block.

Upon completion of the coarse-graining of the average face image, the model generation unit 102 executes mapping processing (step S322). In the mapping processing, the data for learning generated in step S321, i.e., the coarse-grained average face image is mapped on filter values of the weak classifier. The coarse-grained average face image is typically expressed by about 16 to 256 tones as the number of tones, but filter values of a weak classifier generally has a degree of freedom smaller than it. Hence, this processing is executed to reduce the number of tones of the coarse-grained average face image as a high-gradation image to a predetermined value (the predetermined number of tones). Note that the predetermined number of tones is associated with the design items of a weak classifier. In a weak classifier in the learning apparatus 100 according to this embodiment, learning is executed based on a weak classifier model generated by this weak classifier model generation processing. As has already been described above, the degree of freedom of the filter values of a weak classifier corresponds to this number of tones. Therefore, when the number of tones is large, a possibility of improving the expressive power of a weak classifier and allowing detection with higher precision is enhanced. On the other hand, in learning, the number of combinations increases as the expressive power is improved, and a parameter space to be searched is broadened, thus increasing a learning time. A weak classifier described in reference 1 corresponds to a case in which the number of tones=3. When the number of tones used in mapping to a weak classifier is decided, the number of tones can be reduced. Tone reduction can use a known image processing technique. For example, an algorithm of color reduction processing can be applied.

Figure 20:
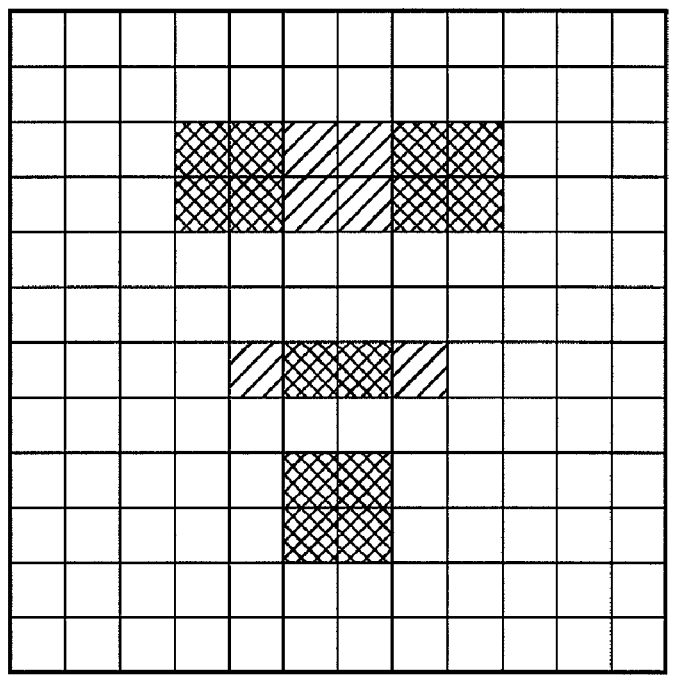
FIG. 20 is a view showing an example of a weak classifier model (filter)

FIG. 20 shows an example of mapped weak classifier filters. The mapping processing itself can be relatively simple processing since it is mapping from two-dimensional data as an image to a two-dimensional rectangular filters. For example, upon normalizing the size of the coarse-grained average face image to that of the rectangular filters, the mosaic processing is applied again, and a pixel value of a pixel of a corresponding rectangular region may be used as a filter value of a weak classifier. Also, the mapping processing may be executed by a method using Self-Organizing Map (SOM). The weak classifier model generation processing has been explained.

<Weak Classifier State Update Processing>

Figure 21:
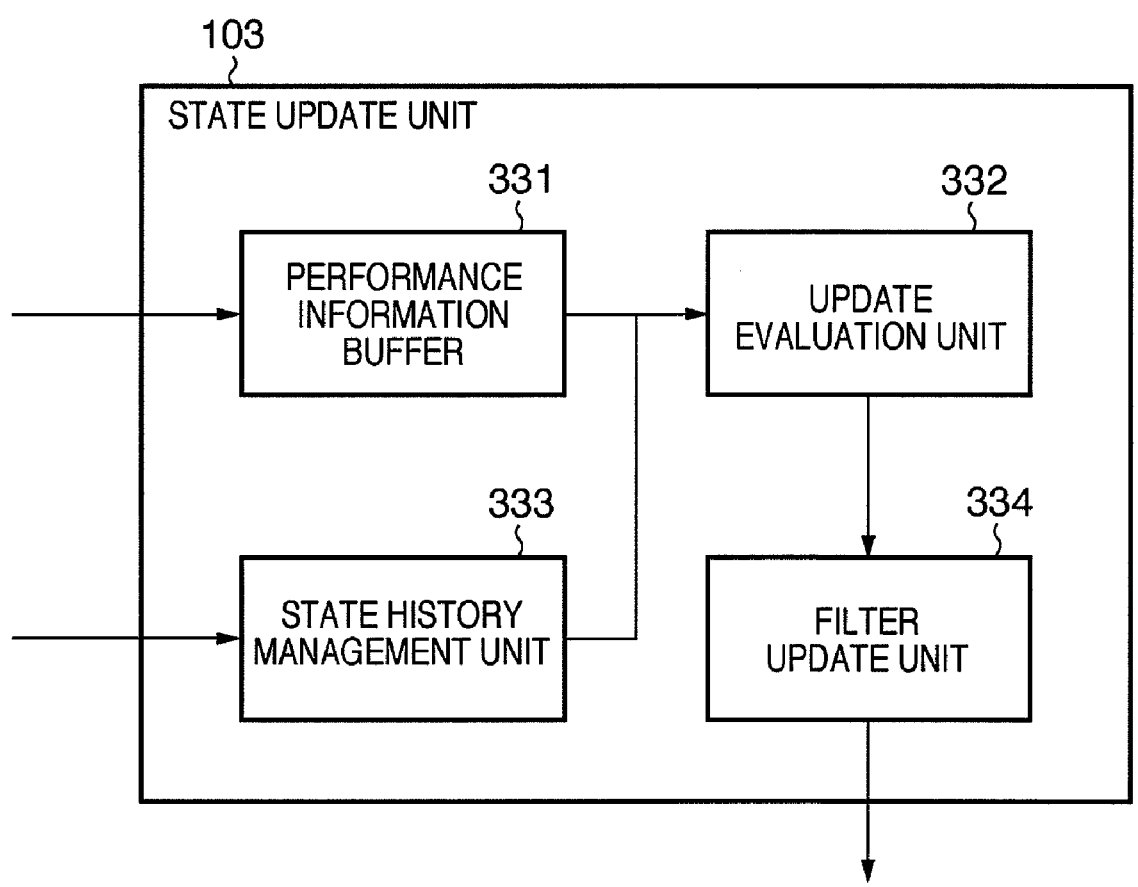
FIG. 21 is a block diagram showing an example of the arrangement of a state update unit.

The weak classifier state update processing in step S212 shown in FIG. 17 will be described below. FIG. 21 is a block diagram showing an example of the arrangement of the state update unit 103.

The state update unit 103 includes a performance information buffer 331, update evaluation unit 332, state history management unit 333, and filter update unit 334.

The performance information buffer 331 receives, as an output from the performance evaluation unit 5 (to be described later), detection performance information of a weak classifier with respect to the data for learning. The update evaluation unit 332 reads out the detection performance information of the weak classifier from the performance information buffer 331, and evaluates from a history (to be described later) based on the readout information in which of stages the state of the weak classifier is to be updated. The state history management unit 333 holds history information indicating the state update history of the weak classifier. More specifically, every time each filter value, a threshold, or the like of the weak classifier is updated, its history is held. The state (for example, an evaluation value used upon determining whether or not to update the state of the weak classifier (to be described later)) of the weak classifier and associated information may be held together. The filter update unit 334 updates the state parameters of a weak classifier, for example, filter values and a threshold. The filter values and threshold can be decided using a method described in, for example, reference 1.

Figure 22:
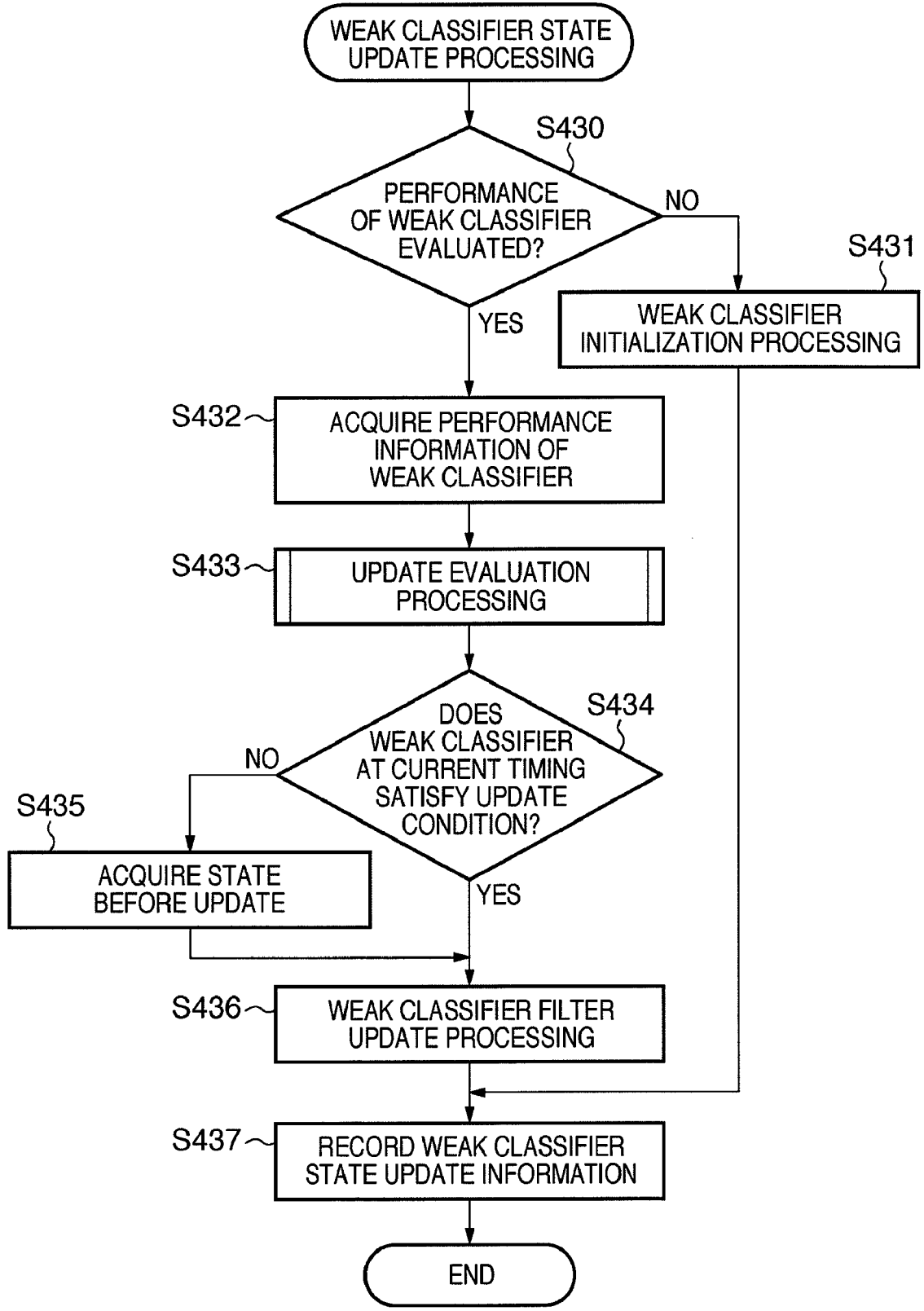
FIG. 22 is a flowchart showing an example of weak classifier state update processing.

FIG. 22 is a flowchart showing an example of the weak classifier state update processing in step S212 shown in FIG. 17. This processing is mainly executed by the state update unit 103.

The state update unit 103 determines if the performance evaluation of a weak classifier at the current timing is complete (step S430). If the performance evaluation is not complete yet, the state update unit 103 executes initialization processing of the weak classifier (step S431). In the initialization processing, for example, the filter values of the weak classifier are set to be the same as those of a model acquired by the aforementioned model generation unit 102. The threshold is initialized by a predetermined value (e.g., zero). On the other hand, if the performance evaluation is complete, the state update unit 103 acquires performance information of the weak classifier (step S432), and evaluates whether or not to update the state (step S433). Details of the evaluation contents executed in this step will be described later. If the weak classifier at the current timing satisfies a condition based on the evaluation result in step S433, the state update unit 103 updates a filter of the weak classifier at the current timing (step S436). Several filter update methods are available. As a typical method, a random update method can be used. This method will be practically explained below.

The state update unit 103 selects a filter position to be updated from the rectangular filter of the weak classifier shown in FIG. 20 above. This selection may be done at random. In case of FIG. 20, the state update unit 103 randomly selects a position to be updated from 12×12 grids.

After the update position is selected, the state update unit 103 updates a value of the rectangular filter at that position. If values that the filter can assume are two values, the other value can be simply set. If the filter can assume integer values of three values or more, a value at the update position is randomly updated. For example, if the filter can assume N values, and a value of the filter before update is n, a value after update other than n is randomly selected from N-1 different values. When a filter value is not an integer value but a real number value, an update method using a random number can be similarly applied. In this case, a uniform random number may be generated between upper and lower limit values of the filter, and may be adopted as a filter value after update. Note that the filter may be updated at a large granularity. That is, filter values at neighboring positions of the randomly selected update position may be updated at the same time. In this case, a filter range which is updated at the same time is arbitrary, and the weak classifier performance evaluation result may be reflected. That is, when the performance is high to some extent, the filter range to be updated at the same time is narrowed down; when the performance is low, the filter range to be updated at the same time is broadened.

As a result of determination in step S434, if the weak classifier at the current timing does not satisfy the update condition, the state update unit 103 returns the state of the weak classifier to that one step before (step S435). This processing is executed with reference to the state update history of the weak classifier held in the state history management unit 333. After the state update unit 103 returns the state of the weak classifier to that one step before, the process advances to filter value/threshold update processing (step S436). In this manner, if the weak classifier at the current timing does not satisfy the update condition, the state update processing is executed after the weak classifier is returned to the state in which the update condition is satisfied.

After the filter value/threshold update processing, the state update unit 103 stores information to hold a state update history (step S437). In this case, the evaluation result of the performance evaluation unit 5 and an evaluation value in update evaluation processing (to be described later) may be stored together.

<Update Evaluation Processing>

The update evaluation processing in step S433 shown in FIG. 22 will be described below. This method is one type of the Markov Chain Monte Carlo method. The method is characterized in that only the immediately preceding state of a weak classifier is referred to upon determination of the state update condition.

Figure 23:
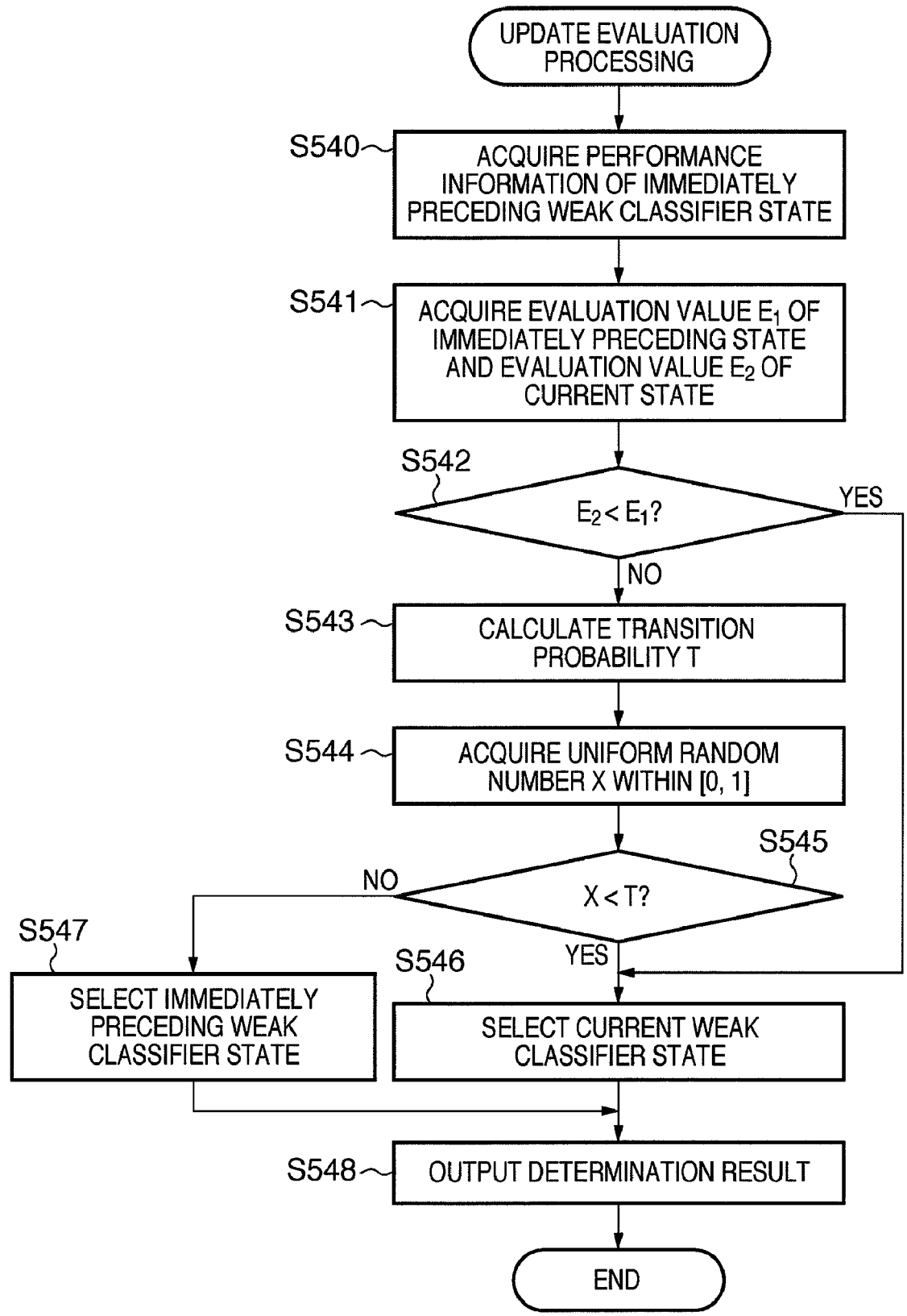
FIG. 23 is a flowchart showing an example of update evaluation processing.

FIG. 23 is a flowchart showing an example of the update evaluation processing.

The update evaluation unit 332 acquires the immediately preceding state and performance information of the weak classifier (step S540). Then, the update evaluation unit 332 calculates the immediately preceding weak classifier state ($E_1$) and current weak classifier state ($E_2$) (step S541). As for the immediately preceding weak classifier state, the value of an evaluation function E may be stored in the performance information buffer 331 as performance information, and may be acquired in the processing of step S540. The evaluation function E is given by:

$$E = -S - \alpha C - \beta P \quad (9)$$

where S is a degree of similarity between the filter shape of the weak classifier model and that of a weak classifier candidate. C is a reciprocal of the detection time as the evaluation result of the performance evaluation unit 5, and P is the detection performance as the evaluation result of the performance evaluation unit 5. α and β are coefficients which assume positive values, and predetermined values are used. The degree of similarity can be calculated to have the filter shapes of the weak classifier model and weak classifier as feature vectors V1 and V2 by calculating:

$$S = \frac{\sum_i V_{1i} V_{2i}}{|V_1| \cdot |V_2|} \quad (10)$$

For example, in case of the rectangular filter shown in FIG. 20, the filter shape can be expressed as a 144(=12×12)-dimensional feature vector. If the inner product of vectors calculated by equation (10), that is, the value S is closer to 1, it represents that the filter shapes of the weak classifier model and weak classifier roughly match, that is, their difference falls within a predetermined range. When the value S becomes large, the value E given by equation (9) becomes small. That is, when the weak classifier reaches a state close to the weak classifier model, the value E becomes small. On the other hand, C and P represent the performance of the weak classifier (they can only assume positive values). Since these values are multiplied by the positive coefficients α and β and are subtracted from E, the value E becomes smaller as the reciprocal C of the detection time is larger (the detection time is shorter) or as the detection performance P is higher (larger). That is, the value E can be reduced as the degree of similarity with the weak classifier model is large, the detection performance of the weak classifier is higher, or the detection time is shorter.

In addition to the degree of similarity given by equation (10), a method of calculating a degree of similarity after applying a predetermined conversion to the feature vectors V1 and V2 is available. For example, the feature vector expression is restricted by dimension reduction that reduces the number of dimensions of the feature vector or quantization (if the feature vector includes real number elements). Alternatively, a kernel function may be applied. By introducing such conversion, the evaluation function given by equation (9) is likely to be easily optimized.

The update evaluation unit 332 determines which of the values E in the immediately preceding state and current state becomes smaller (step S542). If the current weak classifier state makes the value E smaller than the immediately preceding state, the update evaluation unit 332 selects the current weak classifier state. Conversely, if the current weak classifier state makes the value E be larger than the immediately preceding state, the update evaluation unit 332 calculates a transition probability T required to select the current state at a given probability in place of the immediately preceding state (step S543). The transition probability T is given by:

$$T = \exp(-(E_2 - E_1)/t) \quad (11)$$

where $E_1$ is the value of the evaluation function in the immediately preceding state, and $E_2$ is the value of the evaluation function in the current state. t is a parameter used to control the state transition of the weak classifier, and assumes an arbitrary value larger than zero.

Subsequently, the update evaluation unit 332 acquires a uniform random number X within a range [0, 1] (step S544), and compares the transition probability T calculated in step S543 with the value of the uniform random number X acquired in step S544 (step S545). As a result, if the value T is larger than X, the update evaluation unit 332 selects the current weak classifier state (step S546). On the other hand, if the value T is equal to or smaller than X, the update evaluation unit 332 selects the immediately preceding weak classifier state (step S547). Finally, the update evaluation unit 332 in the learning apparatus 100 outputs a selection result of the immediately preceding or current weak classifier state (step S548).

With the above processing, the weak classifier state having a worse value of the evaluation function E than the immediately preceding weak classifier state is accepted at a given ratio. If the parameter t used to control the ratio assumes a large value, a probability to accept the current state even when the evaluation function E is worse than the immediately preceding state increases, and the state transition becomes easier to take place. Conversely, if the value t is small, when the value of the evaluation function E is worse than the immediately preceding state, the state transmission becomes harder to take place. Even when the value of the evaluation function E is large, since a state change is accepted to some extent, the value of the evaluation function E can have a chance to escape from a local minimum.

An optimal weak classifier may be searched by sequentially changing the value t. Typically, a large value t is initially set, and evaluation is repeated while gradually decreasing the value t. As is known, this is a method called simulated annealing, and is effective for an optimal value search problem.

Note that the stage of a weak classifier to be updated is determined using the calculation result of the evaluation function in FIG. 22. However, such evaluation function (used to comprehensively evaluate the performance of the weak classifier as well as the degree of similarity with the weak classifier model and the detection performance and arithmetic speed of the weak classifier) need not always be used. For example, this determination may be made using any of the degree of similarity with the weak classifier model, the detection performance of the weak classifier, and the arithmetic speed of the weak classifier as a criterion.

As described above, according to the third embodiment, a weak classifier model as a basis upon learning of a weak classifier is generated, and the state of the weak classifier generated based on the generated weak classifier model is updated until it satisfies a predetermined performance. In this state update processing, the state (state parameters) of the weak classifier in a stage to be updated is selected from the update history based on the performance evaluation result of the weak classifier, and the selected state of the weak classifier is updated. As a result, even when the expression that the weak classifier can assume is complicated, learning of the weak classifier can be executed at high speed.

In the state update processing of the weak classifier, even when the performance of the weak classifier at the current timing is inferior to its previous performance, since that state change is accepted at a given ratio, the control can be suppressed from falling into a local minimum.

(Fourth Embodiment)

The fourth embodiment will be described below. In this embodiment, only a difference from the third embodiment will be explained. As the difference, a weak classifier model is generated based on data for learning in the third embodiment, but this point is different in the fourth embodiment. That is, the fourth embodiment has a step of generating a basic part of a weak classifier model from data for learning, and then introducing and calculating the concepts of interactions between weak classifier elements and an external field, and the base state of a weak classifier state. The interactions and base state specify a weak classifier model together with the aforementioned basic part of the weak classifier model.

In the weak classifier state update processing of the third embodiment, the degree of similarity with the weak classifier model is used as one of criteria. However, in the fourth embodiment, an evaluation function calculated from the interactions between weak classifier elements and the external field is adopted as one of criteria.

Note that a repetitive description of the same part as in the third embodiment will be avoided in the following description. The arrangement of the learning apparatus 100 according to the fourth embodiment is the same as that shown in FIG. 15 used to describe the third embodiment.

<Weak Classifier Model Generation Processing>

Figure 24:
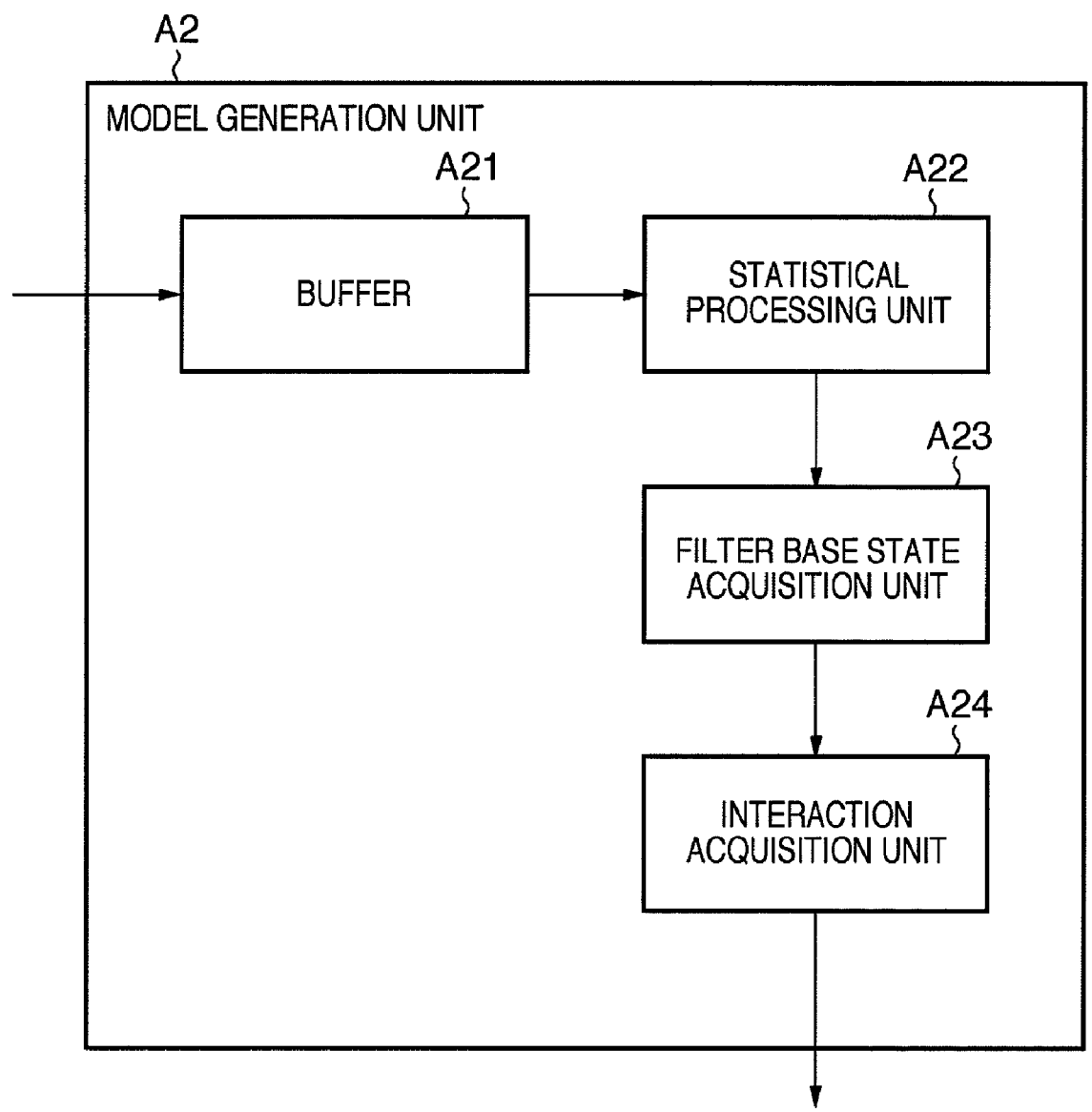
FIG. 24 is a block diagram showing an example of the arrangement of a model generation unit according to the fourth embodiment.

FIG. 24 is a block diagram showing an example of the arrangement of the model generation unit 102 according to the fourth embodiment (to be referred to as a model generation unit A2 hereinafter to be distinguished from the third embodiment). The model generation unit A2 includes a buffer A21, statistical processing unit A22, filter base state acquisition unit A23, and interaction acquisition unit A24. The buffer A21 is a memory area used to temporarily hold data for learning. The statistical processing unit A22 executes statistical processing for images as the data for learning. The filter base state acquisition unit A23 executes processing for acquiring a base state of a weak classifier (to be described later) based on data obtained from the statistical processing unit A22. The interaction acquisition unit A24 executes processing for acquiring interactions between weak classifier elements (to be described later).

Figure 25:
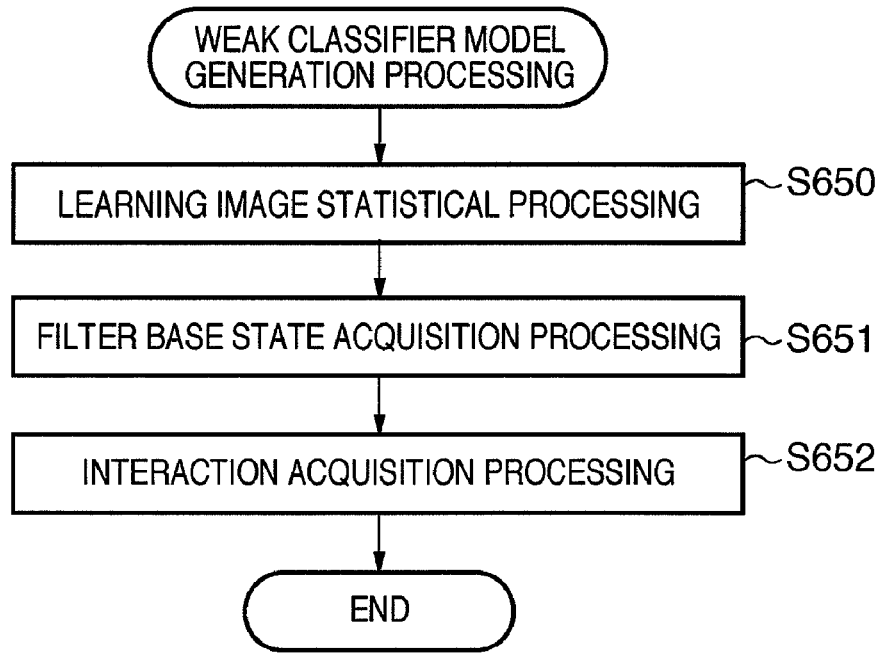
FIG. 25 is a flowchart showing an example of weak classifier model generation processing according to the fourth embodiment.

FIG. 25 is a flowchart showing an example of the weak classifier model generation processing according to the fourth embodiment. This processing is mainly executed by the model generation unit A2.

The model generation unit A2 selects the data for learning held on the buffer A21, that is, images having patterns to be detected (face images in this embodiment), and executes statistical processing for these correct answer images (step S650). More specifically, the model generation unit A2 executes dimension reduction represented by PCA (Principal Components Analysis) or ICA (Independent Components Analysis). In addition, NMF (Non-Negative Matrix Factorization) may be used. These processes are executed according to weights assigned to the data for learning. As a result, the dimension reduction focused on data for learning which are hard to be discriminated is implemented.

The model generation unit A2 executes processing for acquiring a base state of a weak classifier (step S651). Note that the base state of the weak classifier is a state in which a part associated with the filter shape assumes a lowest value in an evaluation function of the weak classifier (to be described later). The base state will be described later in the description of the evaluation function of the weak classifier. Typically, the model generation unit A2 executes processing for converting the dimension-reduced data for learning acquired in step S650 into the filter shape of the weak classifier. For example, when data for learning processed by PCA are used, an eigenvector corresponding to a largest eigenvalue may be converted into an image (so-called eigenface), and the filter shape of the weak classifier as the base state may be calculated by the same method as the coarse-graining processing in the third embodiment. Alternatively, the base state may be calculated using a plurality of eigenvectors. A weighted sum of a predetermined number of eigenvectors based on their corresponding eigenvalues may be converted into an image to calculate the base state. When ICA or NMF is used, decomposition that makes local features of patterns to be detected appear may be applied. In this case, for example, a plurality of data corresponding to local features (eyes, a mouth, and the like in case of a face) are collected and are converted into images, thus building the base state. Or a weak classifier base state used to simply detect only one local feature may be built.

Figure 26:
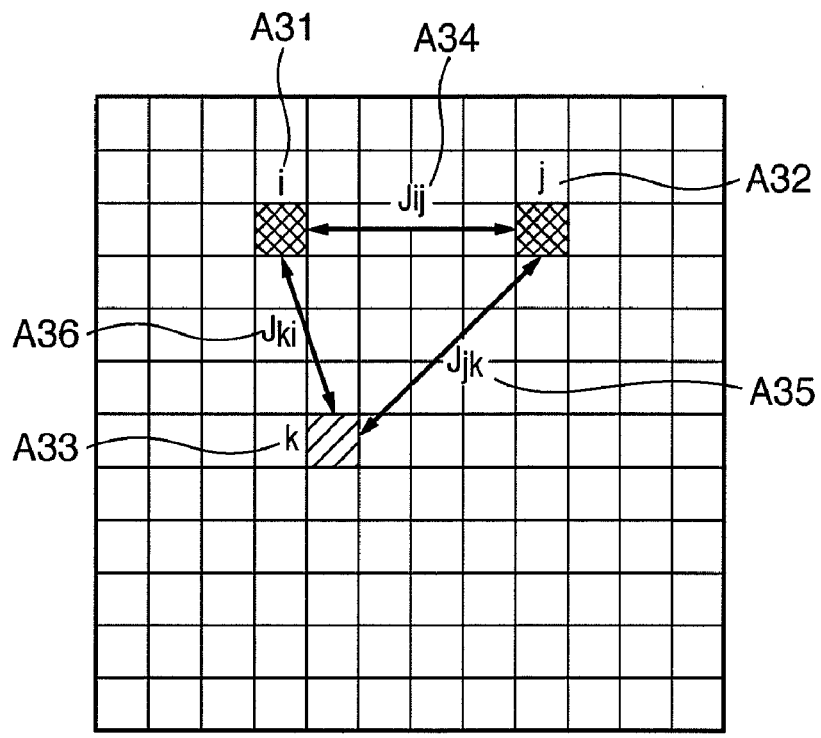
FIG. 26 is a view showing an example of interactions between filter elements of a weak classifier.

Next, the model generation unit A2 executes interaction acquisition processing (step S652). Note that the interaction is that between filter elements which configure the filter shape of the weak classifier. FIG. 26 is a view showing the filter shape of the weak classifier. In FIG. 26, reference symbols A31, A32, and A33 respectively denote i-th, j-th, and k-th filter elements. In FIG. 26, reference symbol A34 denotes an interaction between the i-th and j-th filter elements. Likewise, reference symbols A35 and A36 in FIG. 26 denote interactions between the j-th and k-th filter elements and between the k-th and i-th filter elements. Each of these interactions is that between two filter elements. In addition, an interaction among three filter elements and the like may also be detected. In this step, the model generation unit A2 executes processing for deciding a set of the interactions for all filter elements to realize the base state of the weak classifier acquired in step S651. More specifically, this processing is executed as follows.

A value is calculated by substituting the filter shape of the base state acquired in step S651 in an evaluation function $E_0$ defined using predetermined interactions. When only a two-body interaction is considered between filter elements, the evaluation function $E_0$ is defined as:

$$E_0 = -\sum_{i \ne j} J_{ij} S_i S_j - \sum_i H_i S_i \quad (12)$$

where $S_i$ is the value of the i-th filter element, and $J_{ij}$ is the interaction between the i-th and j-th filter elements. A summation symbol in the first term is made for all combinations of i and j which meet i≠j. $H_i$ in the second term expresses an external field acting on the i-th filter element, and a summation is made for all filter elements. When an interaction of two bodies or more is introduced, for example, an evaluation function including a three-body interaction is given by:

$$E_0 - \sum_{i \ne j} J_{ij} S_i S_j - \sum_{(i,j,k)} J_{ijk} S_i S_j S_k - \sum_i H_i S_i \quad (13)$$

<i, j, k> of a summation symbol in the second term means that sums are calculated for all different combinations of i, j, and k. The meaning of the interaction is as follows. In this case, only a two-body interaction will be examined for the sake of simplicity. Also, assume that a filter element value can assume two values ±1. When the interaction $J_{ij}$ in equation (12) assumes a positive value, the value of the evaluation function $E_0$ is reduced if $S_i$ and $S_j$ have the same sign. On the other hand, when $J_{ij}$ assumes a negative value, the value of the evaluation function $E_0$ is reduced if $S_i$ and $S_j$ have the opposite signs, contrary to the above case. In this way, whether the i-th and j-th filter elements should have the same sign or opposite signs depends on the sign of the interaction $J_{ij}$. Likewise, as for the external field term $H_i$, when $H_i$ and $S_i$ have the same sign, the value of the evaluation function $E_0$ becomes small. When $J_{ij}$ and $H_i$ have different signs, contention occurs. The value of the evaluation function depends on the magnitudes of the absolute values of $J_{ij}$ and $H_i$. Since the larger absolute value makes a larger contribution to the evaluation function, these values serve as important variables used to control the signs of filter elements.

For the aforementioned evaluation function $E_0$, a filter element value in the base state acquired in step S651 is substituted in the filter element value $S_i$ to search for an interaction set (expressed by $\{J_{ij}; H_i\}$ in case of only a two-body interaction) which minimizes the value $E_0$. In practice, it is difficult to search for a minimum value of $E_0$ by changing $\{J_{ij}; H_i\}$ in correspondence with all combinations of filter element values. Decision of this $\{J_{ij}; H_i\}$ can use a known optimization method. For example, methods such as a GA (Genetic Algorithm), GP (Genetic Programming), and PSO (Particle Swarm Optimization) can be used. Also, heuristic information may be used. For example, when a human face is detected, filter elements located at the eye positions should approximately have the same sign. A filter element located at a position between the eyebrows has a sign different from those of filter elements at the mouth and eye positions at a high probability. As described above, interactions between filter elements can be decided. The weak classifier model generation processing has been described.

<Weak Classifier State Update Processing>

The processing contents of the state update unit will be described below. A difference from the third embodiment is the definition of the evaluation function given by equation (9). In place of equation (9), the fourth embodiment adopts the definition given by:

$$E = -E_0 - \alpha C - \beta P \quad (14)$$

where $E_0$ is an evaluation function used in the model generation unit A2. That is, $E_0$ is a function given by equation (12) or (13). As the subsequent update processing, a method that applies the Markov Chain Monte Carlo method described in the third embodiment can be applied. Using the Markov Chain Monte Carlo method, a global minimum value can be efficiently searched for with respect to the evaluation function given by equation (14).

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

The present invention includes a case wherein the functions of the aforementioned embodiments are achieved when a software program is directly or remotely supplied to a system or apparatus, and a computer incorporated in that system or apparatus reads out and executes the supplied program codes. The program to be supplied in this case is a computer program corresponding to the illustrated flowcharts in the embodiments.

Therefore, the program codes themselves installed in a computer to implement the functional processing of the present invention using the computer also implement the present invention. That is, the present invention includes the computer program itself for implementing the functional processing of the present invention. In this case, the form of program is not particularly limited, and an object code, a program to be executed by an interpreter, script data to be supplied to an OS (Operating System), and the like may be used as long as they have the functions of the program.

As a computer-readable storage medium for supplying the computer program, various media can be used. As another program supply method, the user establishes connection to a website on the Internet using a browser on a client computer, and downloads the computer program of the present invention from the website onto a recording medium such as a hard disk.

The functions of the aforementioned embodiments can be implemented when the computer executes the readout program. In addition, the functions of the aforementioned embodiments may be implemented in collaboration with an OS or the like running on the computer based on an instruction of that program. In this case, the OS or the like executes some or all of actual processes, which implement the functions of the aforementioned embodiments.

According to the present invention, even when the expression that each weak classifier can assume is complicated, learning of the weak classifier can be executed at high speed. As a result, a pattern detector with high detection performance can be built within a practical learning time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-171229 filed on Jun. 30, 2008 and 2008-171230 filed on Jun. 30, 2008, which are hereby incorporated by reference herein in their entirety.

What is claimed is:

1. A learning apparatus for a pattern detector, which includes a plurality of weak classifiers and detects a specific pattern from input data by classifications of the plurality of weak classifiers, comprising:
an acquisition unit configured to acquire a plurality of data for learning in each of which whether or not the specific pattern is included is given;
a learning unit configured to make the plurality of weak classifiers learn by making the plurality of weak classifiers detect the specific pattern from the data for learning acquired by the acquisition unit;
a selection unit configured to select a plurality of weak classifiers to be composited from the weak classifiers which have learned by the learning unit;
a composition unit configured to composite the plurality of weak classifiers selected by the selection unit into one composite weak classifier based on comparison between a performance of the composite weak classifier and performances of the plurality of weak classifiers; and
an initialization unit configured to initialize a filter structure of the composite weak classifier after composition by superimposing filter structures of the selected plurality of weak classifiers.

2. The apparatus according to claim 1, wherein the selection unit selects weak classifiers to be composited based on information including a degree of similarity between weak classifiers.

3. The apparatus according to claim 2, wherein the degree of similarity between the weak classifiers is based on at least one of a Minkowski distance, a Hausdorff distance, and a Euclidean distance of filter structures of the weak classifiers.

4. The apparatus according to claim 2, wherein when filter structures of the weak classifiers are expressed by vectors, the degree of similarity between the weak classifiers is based on at least one of an inner product between the vectors, a Euclidean distance between the vectors, and a Minkowski distance between the vectors.

5. The apparatus according to claim 1, further comprising a statistical information holding unit configured to hold statistical information associated with a characteristic evaluation value indicating a detection performance of a weak classifier,
wherein the selection unit selects weak classifiers to be composited based on information including the characteristic evaluation values of weak classifiers held by the statistical information holding unit.

6. The apparatus according to claim 1, wherein the learning unit comprises a weighting unit configured to weight the data for learning, and
the learning unit makes the plurality of weak classifiers learn in turn using data for learning selected from the plurality of data for learning based on weights assigned by the weighting unit, and updates the weights to be assigned to the data for learning using the weighting unit every time learning of each weak classifier is completed.

7. The apparatus according to claim 6, wherein the composition unit composites the plurality of weak classifiers to be composited selected by the selection unit while maintaining a dependence between the weak classifiers caused by an order of learning of the selected weak classifiers.

8. The apparatus according to claim 7, wherein the composition unit executes the composition when a difference between weights assigned to the data for learning updated based on a learning result of the weak classifier which has learned lastly among the plurality of weak classifiers selected by the selection unit, and weights of data for learning updated based on a learning result of the composite weak classifier falls within a predetermined range, so as to maintain the dependence between the weak classifiers.

9. The apparatus according to claim 7, wherein the composition unit executes the composition when weights assigned to the data for learning updated based on a learning result of the weak classifier which has learned lastly among the plurality of weak classifiers selected by the selection unit, and weights of data for learning updated based on a learning result of the composite weak classifier are expressed as vectors, and a degree of similarity between the expressed weighting vectors is larger than a predetermined value, so as to maintain the dependence between the weak classifiers.

10. The apparatus according to claim 9, wherein the degree of similarity between the weighting vectors is based on at least one of an inner product and a Euclidean distance between the vectors.

11. The apparatus according to claim 1, wherein the composition unit executes the composition when a characteristic evaluation value of the composite weak classifier is larger than an accumulated characteristic evaluation value obtained by accumulating characteristic evaluation values of the plurality of weak classifiers to be composited selected by the selection unit.

12. The apparatus according to claim 1, wherein the initialization unit superimposes the filter structures of the plurality of weak classifiers in consideration of characteristic evaluation values of the weak classifiers selected by the selection unit, and a learning result based on weights of data for learning used in learning.

13. The apparatus according to claim 1, wherein the initialization unit initializes the filter structure of the composite weak classifier by expressing, as vectors, filter structures of the plurality of weak classifiers to be composited selected by the selection unit, and executing processing of one of principal component analysis and independent component analysis of the vectors.

14. The apparatus according to claim 1, wherein the composition unit comprises an update unit configured to update a filter structure of the composite weak classifier.

15. The apparatus according to claim 14, wherein the update unit executes the update using a Markov Chain Monte Carlo method.

16. The apparatus according to claim 15, wherein the update unit uses a filter structure of the weak classifier as a state of the weak classifier, and updates the state of the weak classifier by the Markov Chain Monte Carlo method using an evaluation function including the state of the weak classifier as vector elements.

17. The apparatus according to claim 1, wherein a characteristic evaluation value of the weak classifier is based on at least one of a detection ratio of the specific pattern, a detection speed of the specific pattern, and an abortion ratio when the learning unit makes the weak classifier learn using data for learning.

18. The apparatus according to claim 1, wherein a characteristic evaluation value of the weak classifier is based on at least a complexity of a filter structure of the weak classifier.

19. A learning apparatus for a pattern detector, which includes a plurality of weak classifiers and detects a specific pattern from input data by classifications of the plurality of weak classifiers, comprising:
- a model generation unit configured to generate a weak classifier model as a basis of a weak classifier based on a plurality of data for learning, in each of which whether or not the specific pattern is included is given;
- an update unit configured to update state parameters of a weak classifier generated based on the weak classifier model generated by the model generation unit until the weak classifier satisfies a predetermined performance; and
- a management unit configured to manage an update history of the state parameters of the weak classifier in each stage updated by the update unit,
- wherein the update unit selects and updates a state parameter of a stage to be updated of the weak classifier from the update history managed by the management unit based on a performance evaluation result of the weak classifier.

20. The apparatus according to claim 19, wherein the data for learning is an image,
- the model generation unit comprises a statistical processing unit configured to calculate a statistical nature of the data for learning as the image, and
- the model generation unit generates the weak classifier model based on the statistical nature calculated by the statistical processing unit.

21. The apparatus according to claim 20, wherein the model generation unit applies dimension reduction to the data for learning when the statistical processing unit calculates the statistical nature of the data for learning as the image.

22. The apparatus according to claim 19, wherein the data for learning is an image,
- the weak classifier extracts a feature amount from a predetermined region of the data for learning as the image, and determines based on the extracted feature amount if the predetermined region is a candidate of the specific pattern to be detected, and
- the update unit updates, as the state parameter of the weak classifier, a parameter indicating the predetermined region in the data for learning as the image.

23. The apparatus according to claim 19, wherein the update unit selects a state parameter of a stage to be updated of the weak classifier from the update history based on one of a degree of similarity with the weak classifier model generated by the model generation unit, a detection performance, and an arithmetic speed, or a calculation result of an evaluation function which includes these elements and is used to comprehensively evaluate a performance of the weak classifier, upon updating the state parameter of the weak classifier.

24. The apparatus according to claim 23, wherein the degree of similarity is calculated based on an inner product when a rectangular filter of a weak classifier is expressed as a vector.

25. The apparatus according to claim 23, wherein when a rectangular filter of a weak classifier is expressed as a vector, the degree of similarity is calculated based on an inner product after a predetermined conversion is applied to the vector.

26. The apparatus according to claim 19, wherein the update unit selects a state parameter of a stage to be updated of the weak classifier from the update history based on one of an evaluation function which exhibits a lowest value when a difference between states of the weak classifier model generated by the model generation unit and the weak classifier falls within a predetermined range, a detection performance of the weak classifier, and an arithmetic speed, or a calculation result of an evaluation function which includes these elements and is used to comprehensively evaluate a performance of the weak classifier, upon updating the state parameter of the weak classifier.

27. The apparatus according to claim 19, wherein the update unit selects, every given number of selection times, a state parameter of a weak classifier at a current timing as a state parameter to be updated even when a performance of the weak classifier at the current timing is lower than a previous performance, upon updating the state parameter of the weak classifier.

28. The apparatus according to claim 19, wherein the update unit selects a state parameter of a weak classifier of the stage to be updated using a Markov Chain Monte Carlo method.

29. A learning method for a pattern detector, which includes a plurality of weak classifiers and detects a specific pattern from input data by classifications of the plurality of weak classifiers, comprising:
- acquiring a plurality of data for learning in each of which whether or not the specific pattern is included is given;
- making the plurality of weak classifiers learn in turn by making the plurality of weak classifiers detect the specific pattern from the acquired data for learning;
- selecting a plurality of weak classifiers to be composited from the weak classifiers which have learned; and
- compositing the plurality of weak classifiers into one composite weak classifier based on comparison between a performance of the composite weak classifier and performances of the plurality of weak classifiers; and
- initializing a filter structure of the composite weak classifier after composition by superimposing filter structures of the selected plurality of weak classifiers.

30. A learning method for a pattern detector, which includes a plurality of weak classifiers and detects a specific pattern from input data by classifications of the plurality of weak classifiers, comprising:
- generating a weak classifier model as a basis of a weak classifier based on a plurality of data for learning, in each of which whether or not the specific pattern is included is given;
- updating a state parameter of a weak classifier generated based on the generated weak classifier model until the weak classifier satisfies a predetermined performance; and
- managing an update history of the state parameter of the weak classifier in each updated stage,
- wherein the updating comprises selecting and updating a state parameter of a stage to be updated of the weak classifier from the update history managed in the managing based on a performance evaluation result of the weak classifier.

31. A non-transitory computer-readable storage medium storing a computer program for making a computer incorporated in a learning apparatus for a pattern detector, which includes a plurality of weak classifiers and detects a specific pattern from input data by classifications of the plurality of weak classifiers, function as:

an acquisition unit configured to acquire a plurality of data for learning in each of which whether or not the specific pattern is included is given;

a learning unit configured to make the plurality of weak classifiers learn by making the plurality of weak classifiers detect the specific pattern from the data for learning acquired by the acquisition unit;

a selection unit configured to select a plurality of weak classifiers to be composited from the weak classifiers which have learned by the learning unit; and a composition unit configured to composite the plurality of weak classifiers into one composite weak classifier based on comparison between a performance of the composite weak classifier and performances of the plurality of weak classifiers; and an initialization unit configured to initialize a filter structure of the composite weak classifier after composition by superimposing filter structures of the selected plurality of weak classifiers.

32. A non-transitory computer-readable storage medium storing a computer program for making a computer incorporated in a learning apparatus for a pattern detector, which includes a plurality of weak classifiers and detects a specific pattern from input data by classifications of the plurality of weak classifiers, function as:

a model generation unit configured to generate a weak classifier model as a basis of a weak classifier based on a plurality of data for learning, in each of which whether or not the specific pattern is included is given;

an update unit configured to update state parameters of a weak classifier generated based on the weak classifier model generated by the model generation unit until the weak classifier satisfies a predetermined performance; and a management unit configured to manage an update history of the state parameters of the weak classifier in each stage updated by the update unit, wherein the update unit selects and updates a state parameter of a stage to be updated of the weak classifier from the update history managed by the management unit based on a performance evaluation result of the weak classifier.

* * * * *